United States Patent
Gandikota et al.

(10) Patent No.: US 12,242,260 B2
(45) Date of Patent: Mar. 4, 2025

(54) MACHINE LEARNING BASED EQUIPMENT FAILURE PREDICTION

(71) Applicant: Halliburton Energy Services, Inc., Houston, TX (US)

(72) Inventors: Gurunath Venkatarama Subrahmanya Gandikota, Bangalore (IN); Shashwat Verma, Bengaluru (IN); Geetha Gopakumar Nair, Katy, TX (US); Pradyumna Singh Rathore, Bangalore (IN); Janvi Nayan Acharya, Mumbai (IN); Richa Choudhary, Samastipur (IN)

(73) Assignee: Halliburton Energy Services, Inc., Houston, TX (US)

( * ) Notice: Subject to any disclaimer, the term of this patent is extended or adjusted under 35 U.S.C. 154(b) by 798 days.

(21) Appl. No.: 17/449,728

(22) Filed: Oct. 1, 2021

(65) Prior Publication Data
US 2023/0107580 A1 Apr. 6, 2023

(51) Int. Cl.
G05B 23/02 (2006.01)
G06N 5/04 (2023.01)

(52) U.S. Cl.
CPC .......... G05B 23/0283 (2013.01); G06N 5/04 (2013.01)

(58) Field of Classification Search
CPC .... G05B 23/0283; G05B 23/024; G06N 5/04; G06N 20/00
See application file for complete search history.

(56) References Cited

U.S. PATENT DOCUMENTS

| | | | |
|---|---|---|---|
| 7,979,240 | B2 | 7/2011 | Fielder |
| 9,157,308 | B2 | 10/2015 | Balogun et al. |
| 9,292,799 | B2 | 3/2016 | Liu et al. |
| 10,288,760 | B2 | 5/2019 | Noui-Mehidi et al. |
| 10,962,968 | B2 | 3/2021 | Al-Maghlouth et al. |
| 2013/0173505 | A1 | 7/2013 | Balogun et al. |
| 2017/0295253 | A1 | 10/2017 | Siegel et al. |
| 2020/0325766 | A1 | 10/2020 | Gupta et al. |
| 2020/0386091 | A1 | 12/2020 | Eslinger |
| 2021/0165963 | A1 | 6/2021 | Mendes et al. |
| 2021/0181374 | A1 | 6/2021 | Sandnes et al. |
| 2021/0285321 | A1 | 9/2021 | Verma et al. |

(Continued)

FOREIGN PATENT DOCUMENTS

| | | |
|---|---|---|
| EP | 4367533 | 5/2024 |
| WO | 2020206403 | 8/2020 |
| WO | 2021046385 | 3/2021 |

OTHER PUBLICATIONS

"U.S. Appl. No. 17/449,746, Non-Final Office Action", May 8, 2024, 33 pages.

(Continued)

*Primary Examiner* — Walter L Lindsay, Jr.
*Assistant Examiner* — Geoffrey T Evans
(74) *Attorney, Agent, or Firm* — DeLizio, Peacock, Lewin & Guerra, LLP

(57) ABSTRACT

A method comprises receiving a time series of data values for a time window of each operational parameter of a number of operational parameters of equipment; calculating a time derivative feature that comprises a change of the data values of a first operational parameter of the number of operational parameters over the time window; and classifying, using a machine learning model and based on the time derivative feature, an operational mode of the equipment into different failure categories.

20 Claims, 17 Drawing Sheets

(56) References Cited

U.S. PATENT DOCUMENTS

2021/0340869 A1　11/2021　Syresin et al.
2021/0349772 A1　11/2021　Kordjazi et al.

OTHER PUBLICATIONS

"PCT Application No. PCT/US2022/074391, International Search Report and Written Opinion", Nov. 22, 2022, 11 pages.
"U.S. Appl. No. 17/449,746 Final Office Action", Oct. 22, 2024, 45 pages.

| 202 | Ground fault | Broken Shaft | Recirculation Valve | Pump/Intake Plug | Tubing Leak |
|---|---|---|---|---|---|
| Pump inlet pressure | No reading/frozen | Increase | Increase | Increase | Increase |
| Pump discharge pressure | No reading/frozen | Decrease | Same | Decrease | Decrease |
| Flow rate | No reading/frozen | Decrease | Decrease | Decrease | Decrease |
| Motor temp | No reading/frozen | Increase | Increase | Increase | Increase |
| Motor current | Same | Decrease | Same | Decrease | Decrease |
| delta Pdp-WHP | Increase | | | | |

FIG. 2

| Pump Inlet Pressure (PIP) 602 | Pump Discharge Pressure (PDP) 604 | Q 606 | Motor Current ($I_{motor}$) 608 | Motor Temp 610 | Pump Temp 612 | Pump Speed 614 | d(PIP)/dt 616 | d(PDP)/dt 618 | d(PDP)/d(PIP) 620 | d(PDP)/d($I_{motor}$) 622 | Label 624 |
|---|---|---|---|---|---|---|---|---|---|---|---|
| x | x | x | x | x | x | x | 1 | 0 | 1 | -1 | 0 |
| x | x | x | x | x | x | x | 0 | -1 | -1 | 0 | 1 |
| x | x | x | x | x | x | x | 2 | 2 | 0 | 1 | 2 |
| x | x | x | x | x | x | x | -1 | -2 | -2 | -2 | 3 |
| x | x | x | x | x | x | x | -2 | 1 | 2 | 2 | 4 |

FIG. 6

MACHINE LEARNING BASED EQUIPMENT FAILURE PREDICTION

BACKGROUND

The disclosure generally relates to failure prediction of equipment, and more particularly to machine learning based failure prediction of equipment using time derivative and gradient features.

An artificial lift (such as an electric submersible pump (ESP)) can be positioned in a wellbore of a geological formation for hydrocarbon recovery. Such a pump can be positioned in the wellbore to facilitate extraction of fluid within the geological formation up to the surface of the wellbore. Examples of such fluids can be hydrocarbons, water, etc. Such ESPs can be efficient and reliable artificial-lift methods for pumping moderate to high volumes of fluid.

A premature or unplanned failure of an ESP can lead to huge monetary losses due to production disruption. Therefore, prediction of failures can help plan activities better in order to minimize disruptions. One of the challenges with prediction of failure modes is that each failure mode has a different signature.

BRIEF DESCRIPTION OF THE DRAWINGS

Embodiments of the disclosure may be better understood by referencing the accompanying drawings.

FIG. 2 depicts a table of example failure modes and the expected behavior of parameters of operation of an ESP, according to some embodiments.

FIG. 6 depicts a table of examples of values of operational parameters and the associated feature generation (including time derivatives and gradients), according to some embodiments.

DESCRIPTION

Figure 1:
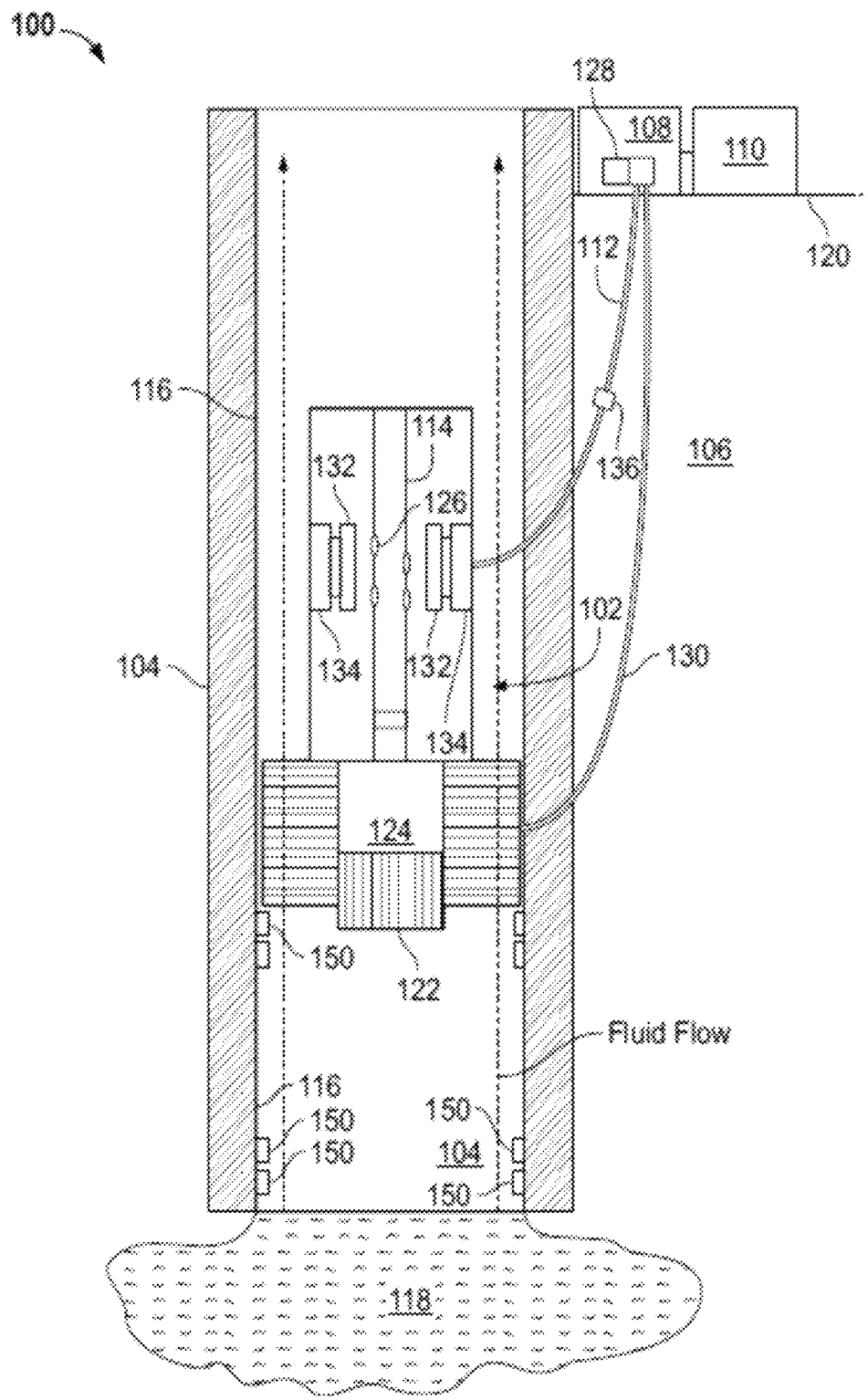
FIG. 1 depicts an example system that includes an ESP positioned in a wellbore for pumping fluids from downhole to the surface, according to some embodiments.

The description that follows includes example systems, methods, techniques, and program flows that embody aspects of the disclosure. However, it is understood that this disclosure may be practiced without these specific details. For instance, this disclosure refers to failure prediction for ESPs performing pumping operations in a wellbore in illustrative examples. Aspects of this disclosure can also be applied to failure prediction for other types of equipment. In other instances, well-known instruction instances, protocols, structures and techniques have not been shown in detail in order not to obfuscate the description.

Example embodiments can include failure prediction of various types of equipment based on capturing both slow and fast moving failure behavior of such equipment. Such failure prediction can be based on machine learning modeling. For example, a slow moving failure can be some type of mechanical failure that can fail over weeks, months, etc. An example fast moving failure (e.g., seconds, minutes, hours, etc.) can include a motor failure after the motor windings are exposed to water. Example embodiments are described such that the equipment is part of an artificial lift system (e.g., electrical submersible pump (ESP)). However, example embodiments can be used for failure prediction for other types of equipment either downhole or at the surface. For example, embodiments can also be used for failure prediction of other types of pumps for other types of applications (e.g., water pumps).

One example of equipment for failure prediction can be equipment for artificial lift systems that can be used in hydrocarbon recovery operations. For example, the artificial lift systems can include an ESP to pump fluids that are downhole in a wellbore to a surface of the wellbore. Some embodiments can include machine learning based failure prediction of these ESPs positioned in a wellbore for fluid pumping operations. As further described below, some embodiments can include a machine learning assisted ruled-based methodology.

Example embodiments can use a machine learning model to detect both slow and fast failure behavior of equipment in order to perform failure prediction of such equipment. In some implementations, new features for a machine learning model (including encoded time derivative and gradient features) can be used to capture both slow and fast failure behavior. Time derivatives can identify changes over time of various operational parameters of the equipment. Gradients can identify a relative increase or decrease of one operational parameter in comparison to a second operational parameter. Thus, various types of failures can be predicted based on relative increase or decrease in various operational parameters. Examples of such operational parameters can include pump frequency (F), pump inlet pressure (PIP), pump discharge pressure (PDP), motor temperature ($T_{motor}$), pump power (P), Motor current ($I_{motor}$), etc. The data values for these operational parameters can be obtained as time series. Additionally, data cleaning, missing value imputation, outlier removal, and data normalization can occur before using a machine learning model for failure prediction.

In some implementations, time derivatives and/or gradients can also be encoded based on a level of change if any. For example, if change is large or drastic (positive or negative), the time derivative or gradient can have an encoded value of 2 or −2, respectively. If change is small (positive or negative), the derivative or gradient can have an encoded value of 1 or −1, respectively. If there is no change or a very minor change, the derivative or gradient can have an encoded value of 0. Also, these features can be labeled with regard to various types of failure modes to provide for classification of data into failure mode categories (such as stable, unstable, pre-failure, failure, etc.). The methodology used to encode the gradients or time derivatives can be based on a linear scale or a non-linear scale (e.g., logarithmic).

In some implementations, another feature for a machine learning model for failure prediction can include outlier features for the data in a given time window. As further described below, examples of outlier features can include count above mean, absolute energy, complexity invariant distance, etc.

Additionally, a rule-based failure detection can include rules to decipher the failure mode after the failure has actually occurred. In some embodiments, if N number of parameters are used to predict performance (good or bad) of equipment, there can be potentially 2^N−1 combinations of operational parameters that can be indicative of modes of stable or unstable performance of the equipment.

Additionally, different machine learning models (e.g., neural networks, random forests, support vector machines, boosting methods, recurrent neural networks (RNNs) (such as long short-term memory (LSTM) and gated recurrent unit (GRU)), etc.) can be used for classification. In some embodiments, pattern recognition can be used for data labelling. Example embodiments can be used for generating training data and can also be deployed to monitor parameters in real time. Also, such embodiments can even provide include operations (such as warning notifications of failures, corrective operations such as adjustment of the ESP, etc.) based on the monitoring (as described herein).

Alternatively or in addition to using time derivative and gradient features, some embodiments can include a multi-window data augmentation to capture both fast and slow moving failing behavior for failure prediction of equipment. In some implementations, the data can be resampled into multiple windows (with a constant window size). Each window can also be condensed into an average set of feature values, encoded time derivatives and gradients. Other types of data augmentation (such as generative adversarial networks) can also be used. Different types of failures can have different behavior. For example, some failures can be drastic or quick, while others failures can be slow. Failures that are drastic or quick can be more difficult to detect if a window having a longer length of time is used. Conversely, failures that are slow can be more difficult to detect if a window having a shorter length of time is used. Thus, example embodiments can include data augmentation using multiple windows of time of different lengths to account for both fast and slow moving failing behavior. Accordingly, operations can include a first step that includes processing different windows separately and a second step to combine the different windows in order to classify different failure types.

Example System

FIG. 1 depicts an example system that includes an ESP positioned in a wellbore for pumping fluids from downhole to the surface, according to some embodiments. In particular, FIG. 1 depicts a system 100 that comprises an ESP 102 positioned in a wellbore 104 of a geological formation 106, a power source 108 to power the ESP 102, a computer 110 coupled to the power source 108, and a data communication path 112. The computer 110 can include a processor and machine-readable media to perform various operations. For example, the processor can execute program code from the machine-readable media to receive and process data received from sensors downhole (via the communication path 112) that provide values of different operational parameters of the ESP 102. The processor can also execute program code to perform failure prediction (as described herein). Additionally, the processor can control and perform various remedial operations regarding the ESP 102 (via the communication path 112) in response to performing failure prediction of the ESP 102. The system 100 facilitates sensing one or more of a rotation speed and rotation direction of a motor shaft 114 of the ESP 102 and conveying information indicating the rotation speed and/or rotation direction of the motor shaft 114 between the ESP 102 and the computer 110 via the data communication path 112.

The ESP 102 lifts moderate to high volumes of fluids from the wellbore 104. The fluids may be pumped via a fluid column such as tubing 116 that spans between a reservoir 118 and a surface 120. The tubing 116 may have one or more perforations 150 that allows fluid, such as hydrocarbons, in the reservoir 118 to flow into the tubing 116. In turn, the ESP 102 may pump the fluid, such as hydrocarbons, that flows into the tubing 116 to the surface 120.

The ESP 102 may have a motor base 122 on which a motor 124 and the motor shaft 114 are mounted. The motor 124 may take the form of an induction motor that rotates the motor shaft 114. The motor shaft 114 is, in turn, coupled to a pump impeller (not shown) such that rotation of the motor shaft 114 causes the ESP 102 to generate artificial lift which pumps the fluid, such as hydrocarbons, from a reservoir 118 in the geological formation 106 to the surface 120. The motor shaft 114 may be made of steel or some other material. The motor shaft 114 may have one or more identifiers 126 that facilitates detection of one or more of a rotation speed and rotation direction of the motor shaft 114. The identifiers 126 may be existing or specifically-created marks, cuts, holes, slots, splines, or embedded magnetics or magnetic material in or on the motor shaft 114. The identifiers 126 may be machined, formed, and/or attached to the motor shaft 114.

The motor 124 of the ESP 102 may be powered via the power source 108 that is located at the surface 120 of the geological formation 106 or downhole. The power source 108 may be arranged in a wye configuration and output one or more voltage signals having different relative phases. For example, each voltage signal may be separated by a given phase angle such as 120 degrees. The one or more voltage signals may be input into a transformer 128 having a primary side and a secondary side. A turns ratio between the primary and secondary side may be 4:1. The turns ratio results in a voltage signal at 480 volts AC inducing a voltage of 1920 volts AC on the secondary side of the transformer. The higher voltage allows for efficient transfer of the power downhole at a lower current via a powerline 130 to the motor 124 and inducing a magnetic field on a stator winding in the motor 124 which in turn produces torque on the motor shaft 114 causing the motor 124 to rotate in a specific direction.

The ESP 102 may have a sensor 132 to sense the identifiers 126 as the motor shaft 114 rotates. The sensor 132 may be mounted around the motor shaft 114. The sensor 132 is shown mounted on the collar 134 or shaft guard positioned around the motor shaft 114, but could also be mounted on the motor base 122. The sensor may detect proximity to the identifier as the motor shaft rotates. In one or more examples, the identifier 126 may take the form of a magnetic spline and the sensor 132 may take the form of a Hall effect sensor. The Hall effect sensor outputs an analog signal that varies in response to a magnetic field. When the magnetic spline is closest to the sensor 132 as the motor shaft 114 rotates, the detected magnetic field is strong, while when the magnetic spline is farthest away from the sensor 132 as the motor shaft 114 rotates, the detected magnetic field is weak. The analog signal output by the Hall effect sensor may be proportional to a strength of the magnetic field. The sensor 132 can take other forms including a coil of wire such as aluminum or copper wound around a nonmagnetic core, or inductive proximity magnetic field. If the identifier includes cuts, holes, slots, splines without magnetic properties, then sensor 132 may take the form of optical sensors. The optical sensor may detect presence of the identifier in a field of view of the optical sensor as the motor shaft rotates and provide an indication that the identifier is detected. For example, the optical sensor may output a pulse when the identifier is in the field of view of the optical sensor.

The sensor 132 may be associated with sensor circuitry such as analog hardware, digital hardware, and/or software to determine one or more of shaft position, rotation speed and rotation direction of the motor shaft 114 based on an output of the sensor 132. In one or more examples, the sensor circuitry may be integrated with the sensor 132 or separate in the ESP. In one or more examples, the sensor circuitry may be coupled to a downhole gauge 136. The downhole gauge 136 may receive data indicating the shaft position, rotation speed and/or rotation direction of the motor shaft 114 from the sensor circuitry and modulate a DC signal in voltage and/or current indicating the shaft position, speed, and direction of rotation of the motor 124 to convey the data to the surface 120 via the data communication path 112. One end of the data communication path 112 may terminate at the downhole gauge 136. The other end of the data communication path 112 may be a tap off a center of the wye configuration in the power source 108. In this regard, the data communication path 112 may carry the DC signal that is then modulated.

There can be additional sensors downhole for monitoring other types of operational parameters of the ESP 102. For example, the ESP 102 can include sensors to measure flow rates, pressure and temperature at different locations, etc. For instance, the ESP 102 can include a sensor to measure pressure an inlet of the pump and a sensor to measure the discharge pressure of the pump. The ESP 102 can also include a sensor to measure temperature of the motor and a sensor to measure temperature of the pump. The ESP 102 can include sensors to measure various electrical attributes of the ESP 102. For example, there can be a sensor to measure current of the motor of the ESP 102. These sensors can transmit (via the communication 112) a periodic time series of data values of these operational parameters to the processor of the computer 110. As further described below, the processor can perform failure prediction of the ESP 102 based on these data values.

The computer 110 may receive data indicating rotation speed and rotation direction of the motor shaft 114 from the power source 108 to make a determination as to whether to power the motor 124 and/or to calculate how much fluid is pumped by the ESP 102. The determination of when to power the motor 124 may be important because when the motor is powered off, there may be fluid remaining in the tubing 116 that does not reach the surface 120. This fluid may flow back down into the reservoir 118 and cause the pump impeller to rotate and in turn cause the motor shaft 114 and the motor 124 to rotate in a direction opposite to which it would spin if the fluid is pumped to the surface 120. The computer 110 may not apply power to the motor 124 if the motor shaft 114 is rotating in a direction indicating that fluid is flowing down the tubing 116 into the reservoir 118 because application of power to the motor 124 will cause the motor 124 to rotate in an opposite direction, applying excessive stress on the motor shaft 114. Further, power would be consumed to rotate the motor 124 in the opposite direction to counteract the downward flowing fluid resulting in the motor 124 not rotating as fast and/or rotating inefficiently. Alternatively, the computer 110 may control power applied to the motor 124 if data indicates that the motor 124 is not rotating or if the motor 124 is rotating in a direction indicating that fluid is flowing up the tubing 116. As yet another example, the computer 110 may control power applied to the motor 124 if the motor 124 is rotating in backspin at less than a given speed because stress on the motor shaft 114 may be minimal. In this regard, the rotation speed and/or rotation direction may be used to determine whether the motor 124 is in backspin and to apply power to the motor 124 when risk of stress on the motor shaft 114 and/or inefficiency is low.

Determination of rotation speed and/or rotation direction is also important to control the fluid pumping from the reservoir 118 in the geological formation 106 to the surface 120 when the motor 124 is powered on. The rotation speed and/or rotation direction facilitates accurate calculation of fluid pumped by the motor 124. An amount of fluid pumped by the motor 124 at a given rotation speed may be known. For example, the motor 124 may pump a given volume of fluid per revolution of the motor 124 when the motor 124 rotates in a given direction. Based on the speed of the motor 124 and/or the direction in which the motor 124 is rotating, a determination can be made as to the quantity of fluid pumped by the motor 124 so as to accurately control fluid production from the reservoir 118.

As further described below, example embodiments can use machine learning models to perform failure prediction of equipment such as the ESP 102. Such embodiments can monitor behavior of various parameters of operation of the ESP 102 in order to determine various failure modes. To illustrate, FIG. 2 depicts a table of example failure modes and the expected behavior of parameters of operation of an ESP, according to some embodiments. FIG. 2 depicts a table 200 that includes columns 202-212. The column 202 includes example parameters of operations that can be monitored-pump inlet pressure, pump discharge pressure, flow rate, motor temperature, motor current, and change in pump discharge pressure relative to work horsepower.

The columns 204-212 include example failure modes. The column 204 includes a ground fault failure. In this example, a ground fault could have occurred for the ESP 102 if the parameters of operation have the following values: (1) pump inlet pressure, pump discharge pressure, flow rate and motor temperature are providing no reading or are frozen, (2) motor current remains the same, and (3) change in pump discharge pressure relative to work horsepower increases.

The column 206 includes a broken shaft failure. In this example, the ESP could have a broken shaft if the parameters of operation have the following values: (1) pump inlet pressure increases, (2) pump discharge pressure decreases, (3) flow rate decreases, (4) motor temperature increases, and (5) motor current decreases. The column 208 includes a recirculation valve failure. In this example, the ESP could have a recirculation valve failure if the parameters of operation have the following values: (1) pump inlet pressure increases, (2) pump discharge pressure remains the same, (3) flow rate decreases, (4) motor temperature increases, and (5) motor current remains the same.

The column 210 includes a pump or intake plug failure. In this example, the ESP could have a pump or intake plug failure if the parameters of operation have the following values: (1) pump inlet pressure increases, (2) pump discharge pressure decreases, (3) flow rate decreases, (4) motor temperature increases, and (5) motor current decreases. The column 212 includes a tubing leak failure. In this example, the ESP could have a tubing leak failure if the parameters of operation have the following values: (1) pump inlet pressure increases, (2) pump discharge pressure decreases, (3) flow rate decreases, (4) motor temperature increases, and (5) motor current decreases.

Figure 3:
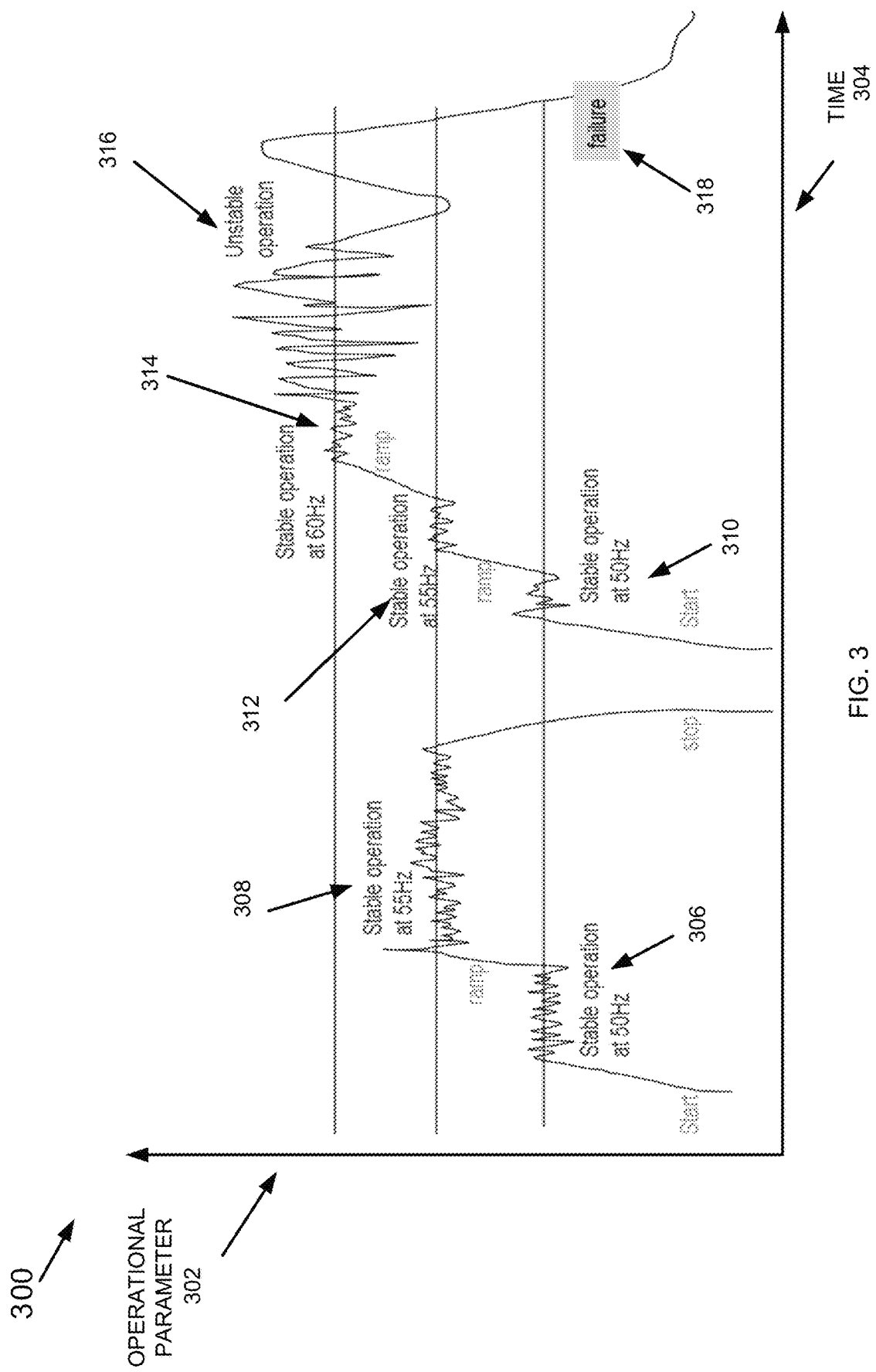
FIG. 3 depicts an example graph of data labeling of operations of an ESP that include stable, unstable, and failure over time, according to some embodiments.

To further illustrate, FIG. 3 depicts an example graph of data labeling of operations of an ESP that include stable, unstable, and failure over time, according to some embodiments. FIG. 3 depicts a graph 300 having a y-axis 302 for an operational parameter and an x-axis 304 for time. In this example, an operational parameter of the equipment changes over time can be indicative of different types of operation of the equipment (including stable, unstable, and failure). For example, the operational parameter can be pressure, current, flow rate, etc. As shown in the graph 300, operation of the equipment starts operation such that the value of the operational parameter ramps up to a range that is indicative of the equipment where operation of the equipment is stable at 50 Hertz (Hz) at 306. The value of the operational parameter subsequently ramps up to another range of stable operation of the equipment at 55 Hz at 308. The value of the operational parameter subsequently ramps down operation to a point where the equipment stops operation.

Also as shown in the graph 300, at a subsequent time, operation of the equipment restarts operation such that the value of the operational parameter ramps up again to a range indicative of a stable operation by the equipment at 50 Hertz (Hz) at 310. The value of the operational parameter subsequently ramps up to another range that is also indicative of stable operation of the equipment at 55 Hz at 312. The value of the operational parameter subsequently ramps up to another range that is indicative of a stable operation of the equipment at 60 Hz at 314. However, the value of the operational parameter enters a range indicative of an unstable operation of the equipment (316). Subsequently, the value of the operational parameter ramps down to a point that is indicative of the equipment failing (318).

Example Operations—Time Derivative and Gradient Features

Figure 4:
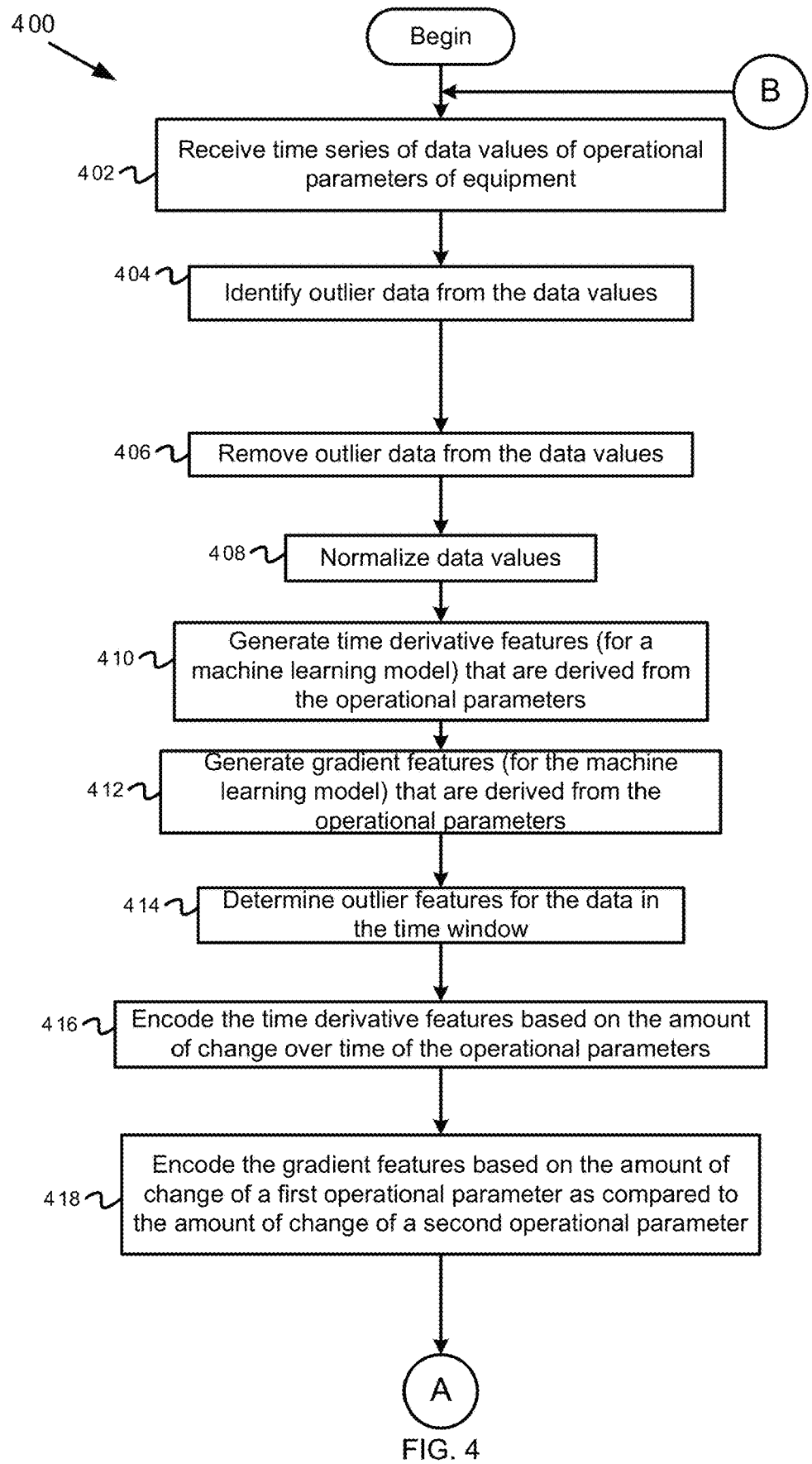
FIGS. 4-5 depict a flowchart of example operations for training a machine learning model for failure prediction of equipment using time derivative and gradient features of operational parameters of the equipment, according to some embodiments.
Figure 5:
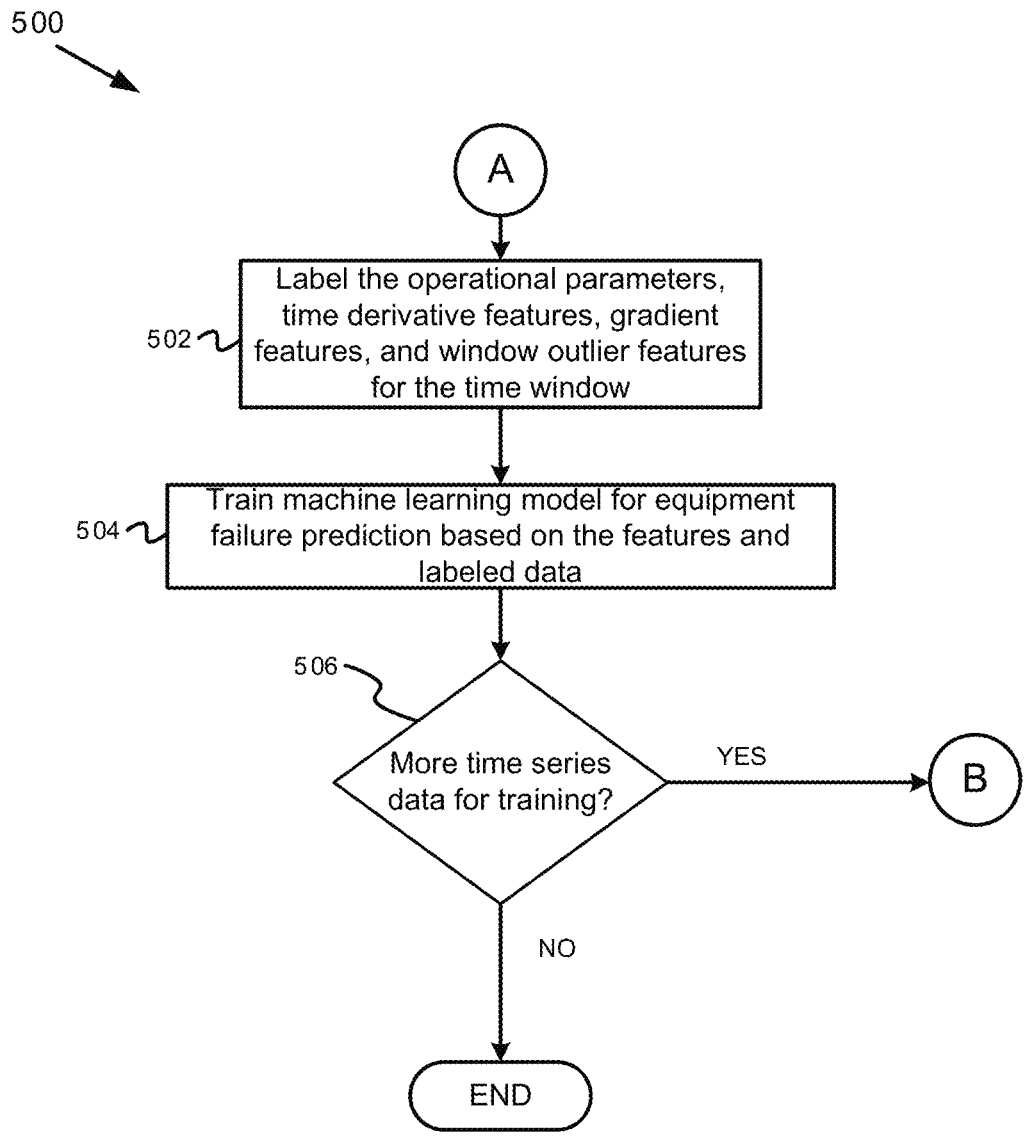

FIGS. 4-5 depict a flowchart of example operations for training a machine learning model for failure prediction of equipment using time derivative and gradient, and window outlier features of operational parameters of the equipment, according to some embodiments. Operations of flowcharts 400-500 of FIGS. 4-5 continue through transition points A and B. Operations of the flowcharts 400-500 can be performed by software, firmware, hardware or a combination thereof. Such operations are described with reference to the system 100 of FIG. 1. However, such operations can be performed by other systems or components. For example, some of all of the operations can be performed by a processor downhole in the wellbore. The operations of the flowchart 400 start at block 402.

At block 402, data values of operational parameters of equipment or device are received. For example, with reference to FIG. 1, the processor of the computer 110 can receive (via the communication path 112) a periodic time series of data values for different operational parameters of the ESP 102 from the sensors of the ESP 102. For instance, the processor can receive periodic data values of operational parameters such as pump inlet pressure, pump discharge pressure, flow rates, level of current of the motor, temperature of the motor and pump, etc. For example, the processor can receive a data value for operational parameter A every second, receive a data value for operational parameter B every minute, etc.

At block 404, outlier features are identified within the data values. For example, with reference to FIG. 1, the processor of the computer 110 can identify the outlier features for a given window of time. Such identification can help understand the time dependency of the data values in a given window. Example operations of identifying outlier features are described in more detail below in reference to FIGS. 7-8.

At block 406, outlier features are removed from the data values. For example, with reference to FIG. 1, the processor of the computer 110 can remove the outlier features. In some embodiments, the processor can remove one or more of the outlier features identified at block 404.

At block 408, data values are normalized. For example, with reference to FIG. 1, the processor of the computer 110 can normalize the data values in each of the time series. Removal of outlier features and data normalization are two examples of data cleaning of the data values. Other types of data cleaning (such as inserting missing values from the time series) can also be performed to identify and correct inaccurate data from the time series.

At block 410, time derivative features for a machine learning model are generated for the time series and are derived from the data values of the operational parameters. For example, with reference to FIG. 1, the processor of the computer 110 can generate the time derivative features. In some embodiments, the time derivative features can be a change in a given operational parameter over a given time period. For example, a time derivative feature can be a change in the pump inlet pressure over the change in time for a given window of time.

To illustrate, FIG. 6 depicts a table of examples of values of operational parameters and the associated feature generation (including time derivatives and gradients), according to some embodiments. FIG. 6 depicts a table 600 having columns 602-624. The columns 602-614 include example operational parameters. The columns 616-618 include example time derivatives. The columns 620-622 include example gradients. The column 624 include example labels.

The column 602 includes the pump inlet pressure (PIP) for a pump of the equipment. The column 604 includes the pump discharge pressure (PDP) for a pump of the equipment. The column 606 includes a Q operational parameter of the equipment. The column 608 includes a motor current ($I_{motor}$) for a motor of the equipment. The column 610 includes a motor temperature for a motor of the equipment. The column 612 includes a pump temperature for a pump of the equipment. The column 614 includes a pump speed for a pump of the equipment.

The example time derivative features which are derived from the operational parameters are included in the columns 616-618. The column 616 includes an example time derivative of a change in the pump inlet pressure over time. The column 618 includes an example time derivative of a change in the pump discharge pressure over time. Encoded values are assigned to each time derivative. In this example, the encoded values can be −2, −1, 0, 1, and 2.

If the value of an operational parameter has drastically decreased over time, the encoded value of the time derivative can be −2. If the value of an operational parameter has decreased slowly (incrementally) over time, the encoded value of the time derivative can be −1. If the value of an operational parameter has drastically increased over time, the encoded value of the time derivative can be 2. If the value of an operational parameter has increased slowly (incrementally) over time, the encoded value of the time derivative can be 1. If the value of the operational parameter remains essentially unchanged (or is below some threshold), the encoded value of the time derivative can be 0.

The example gradient features which are derived from the operational parameters are included in the columns 620-622. The column 620 includes an example gradient of a change in the pump discharge pressure as compared to the pump inlet pressure. The column 622 includes an example gradient of a change in the pump discharge pressure as compared to the motor current. Encoded values are assigned to each gradient. In this example, the encoded values can also be −2, −1, 0, 1, and 2.

If the value of a first operational parameter has drastically decreased as compared to a value of a second operational parameter, the encoded value of the gradient can be −2. If the value of a first operational parameter has slowly (incrementally) decreased as compared to a value of a second operational parameter, the encoded value of the gradient can be −1. If the value of a first operational parameter has drastically increased as compared to a value of a second operational parameter, the encoded value of the gradient can be 2. If the value of a first operational parameter has slowly (incrementally) increased as compared to a value of a second operational parameter, the encoded value of the gradient can be 1. If the value of the first operational parameter as compared to the value of the second operational parameter remains essentially unchanged (or is below some threshold), the encoded value of the derivative can be 0.

The definition of drastic decrease, incremental decrease, drastic increase, incremental increase, and essentially unchanged can vary for both the time derivative and gradient features and can be based on various factors (such as type of features, type of equipment, type of operation, type of application, etc.). Also, this is one example of an encoding of the time derivative and gradient features. However, any other type of encoded scheme can be used.

Returning to operations of the flowchart 400 of FIG. 4, the processor can generate one or more time derivative features depending on the type of equipment, type of operation, length of time of operation of the equipment, etc. Operations of the flowchart 400 continue at block 412.

At block 412, gradient features for the machine learning model are generated for the time series and are derived from the data values of the operational parameters. For example, with reference to FIG. 1, the processor of the computer 110 can generate the gradient features. In some embodiments, the gradient features can be a given operational parameter changes as compared to a different operational parameter over a given time period. For example, a gradient feature can be change in the pump inlet pressure over the change the pump speed.

At block 414, outlier features for a time window are determined. For example, with reference to FIG. 1, the processor of the computer 110 can make this determination. An example of determining outlier features for a time window is further described below in reference to FIG. 7-8.

At block 416, the time derivative features are encoded based on the amount of change over time of the operational parameter. For example, with reference to FIG. 1, the processor of the computer 110 can encode the time derivative features. An example of such encoding of time derivative features is described above in reference to FIG. 6.

At block 418, the gradient features are encoded based on the amount of change of the operational parameter as compared to a different operational parameter. For example, with reference to FIG. 1, the processor of the computer 110 can encode the gradient features. An example of such encoding of the gradient features is described above in reference to FIG. 6. Operations of the flowchart 400 continue at transition point A, which continues at transition point A of the flowchart 500. From the transition point A of the flowchart 500 operations continue at block 502.

At block 502, the data for a given time window is labeled. For example, with reference to FIG. 1, the processor of the computer 110 can perform the labeling. The labeling can be different values for failure prediction. For example, the labeling can be indicative of different operational modes of the equipment, such as stable, unstable, pre-failure, failure, etc. In some embodiments, pattern recognition can be used for data labelling.

At block 504, a machine learning model is trained for equipment failure prediction based on the features and labeled data. For example, with reference to FIG. 1, the processor of the computer 110 can perform the training of a machine learning model. Different machine learning models (e.g., neural networks, random forests, support vector machines, boosting methods, recurrent neural networks (RNNs) (such as long short-term memory (LSTM) and gated recurrent unit (GRU)), etc.) can be used for classification.

At block 506, a determination is made of whether there are more time series data values to be processed for training. For example, with reference to FIG. 1, the processor of the computer 110 can make this determination. If there are more time series data values to be processed for training, operations of the flowchart 500 continue at transition point B, which continues at transition point B of the flowchart 400, where more time series data values are received at block 402. Otherwise, operations of the flowchart 500 are complete.

Figure 7:
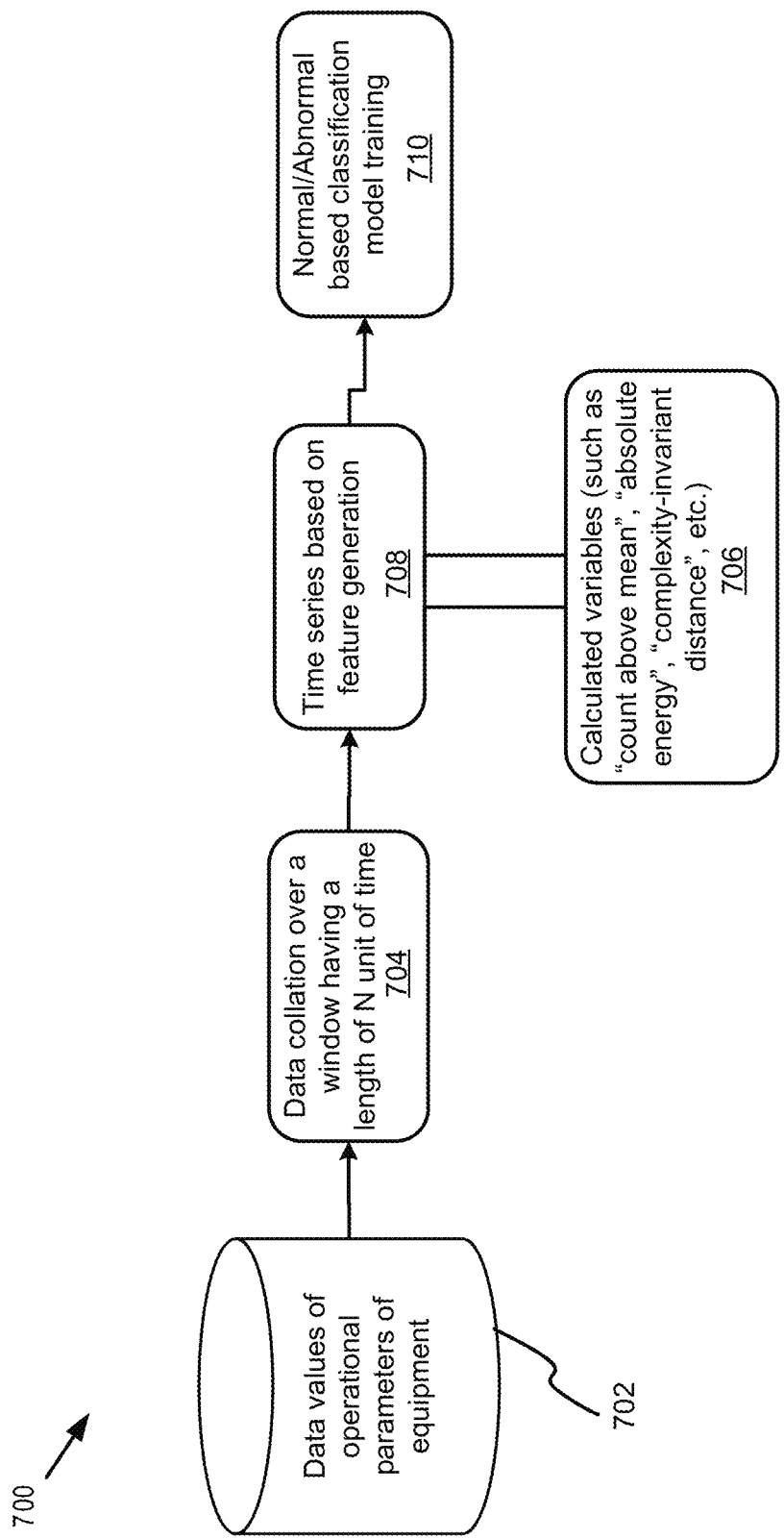
FIG. 7 depicts an example data flow diagram for detecting outliers in the data values of the parameters defining operations of the ESP for failure prediction, according to some embodiments.

FIG. 7 depicts an example data flow diagram for detecting outliers in the data values of the parameters defining operations of the ESP for failure prediction, according to some embodiments. FIG. 7 depicts a data flow diagram 700 that includes a data storage 702 for storage of data values of operational parameters of equipment (e.g., an ESP). A collation 704 of the data values (from 702) that are over a time window having a length N unit of time is created. The length of the time window can vary depending on the type of operational parameter, type of application, etc.

The calculated variables 706 used for determining outlier features can also be determined. For example, the calculated variables 706 can include a "count over mean", "absolute energy", "complexity-invariant distance", etc. The collation 704 of data values and the calculated variable 706 can be input into the operation to perform time series based feature generation (708). This operation 708 can be used to determine outlier features within the time window for the given operational parameter (flowrate).

Figure 8:
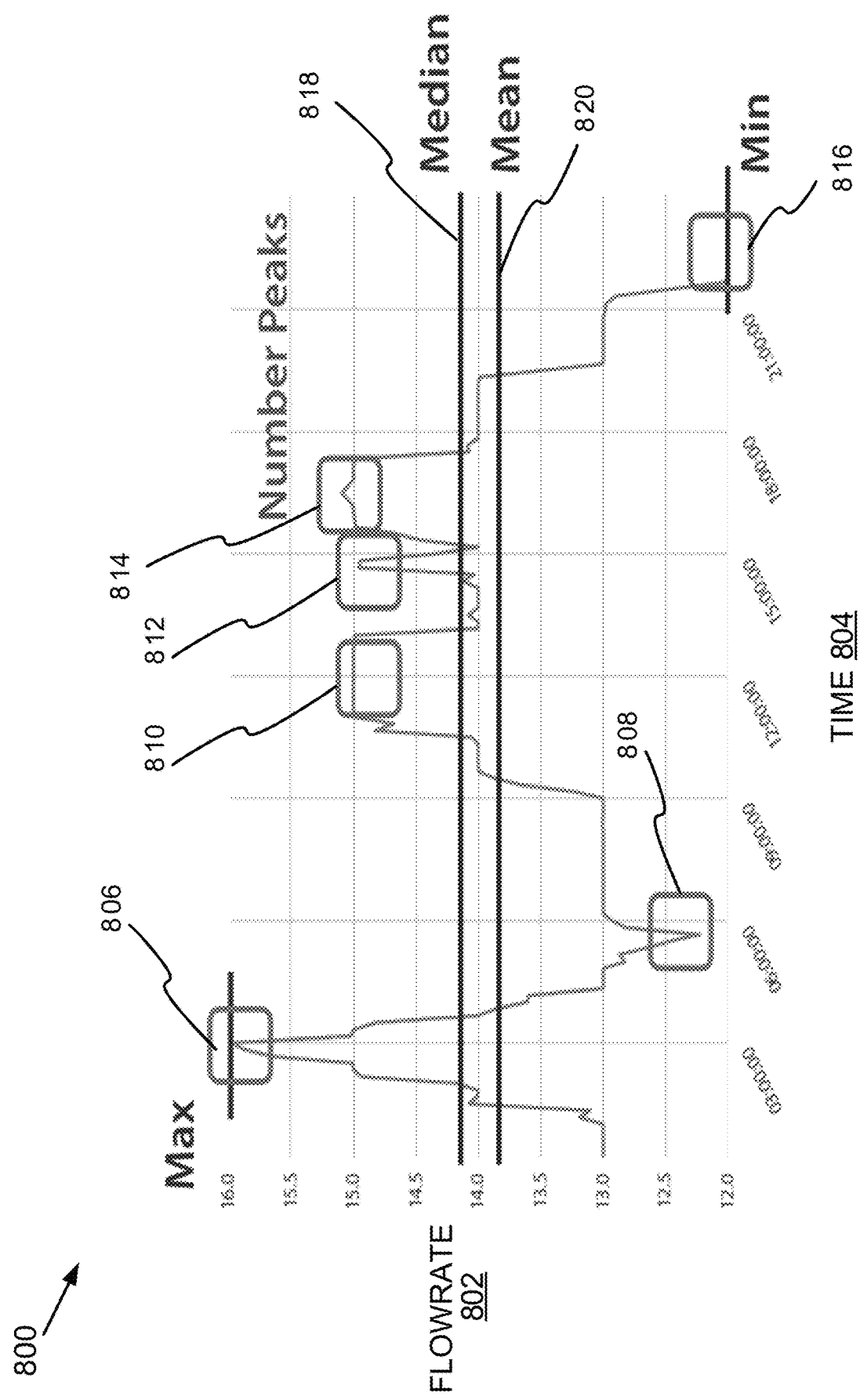
FIG. 8 depicts an example window outlier graph, according to some embodiments.

To illustrate, FIG. 8 depicts an example window outlier graph, according to some embodiments. FIG. 8 depicts a graph 800 of a collation of data values over a given length of time. The graph 800 includes a Y-axis 802 is a flowrate and an X-axis 804 is time. A median value 818 and a mean value 820 for the flowrate 802 for the defined window are determined. Also, a number of peaks 806, 808, 810, 812, 814, and 816 for the flowrate 802 for the defined time window are determined. Among those number of peaks, a maximum peak 806 and a minimum peak 816 can also be determined. In this example, the outlier features can be based on these points in the graph 800. For example, the outlier features can include "counter over mean", "absolute energy", "complexity-invariant distances", the number of peaks, the value of the maximum peak 806, the value of the minimum peak 816, etc.

Returning to the data flow diagram 700 of FIG. 7, the identified outlier features for the time window can be input to a normal/abnormal classification model training 710 for training a machine learning model to identifying anomalies in a window of data. Thus, the machine learning model can be trained to identify various outlier features (such as the number and magnitude of anomalies, complexity of the time series, the magnitude of changes of the operational parameter across a time window, etc. In some embodiments, using such outlier features can provide a more accurate classification based on the time dependency of the values of an operational parameter.

Figure 9:
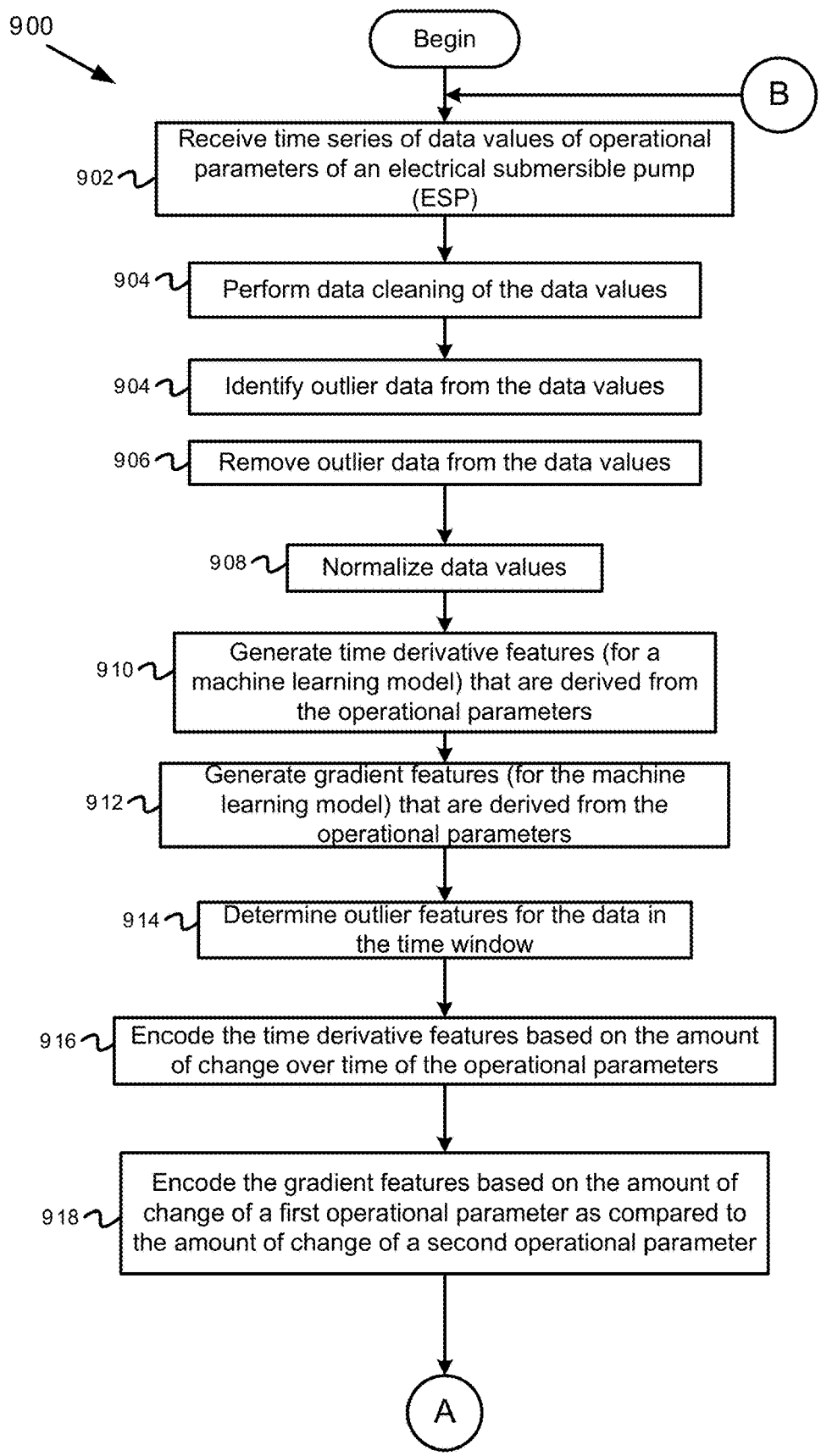
FIGS. 9-10 depict a flowchart of example operations for using a trained machine learning model for failure prediction of equipment using time derivative and gradient features of operational parameters of the equipment, according to some embodiments.
Figure 10:
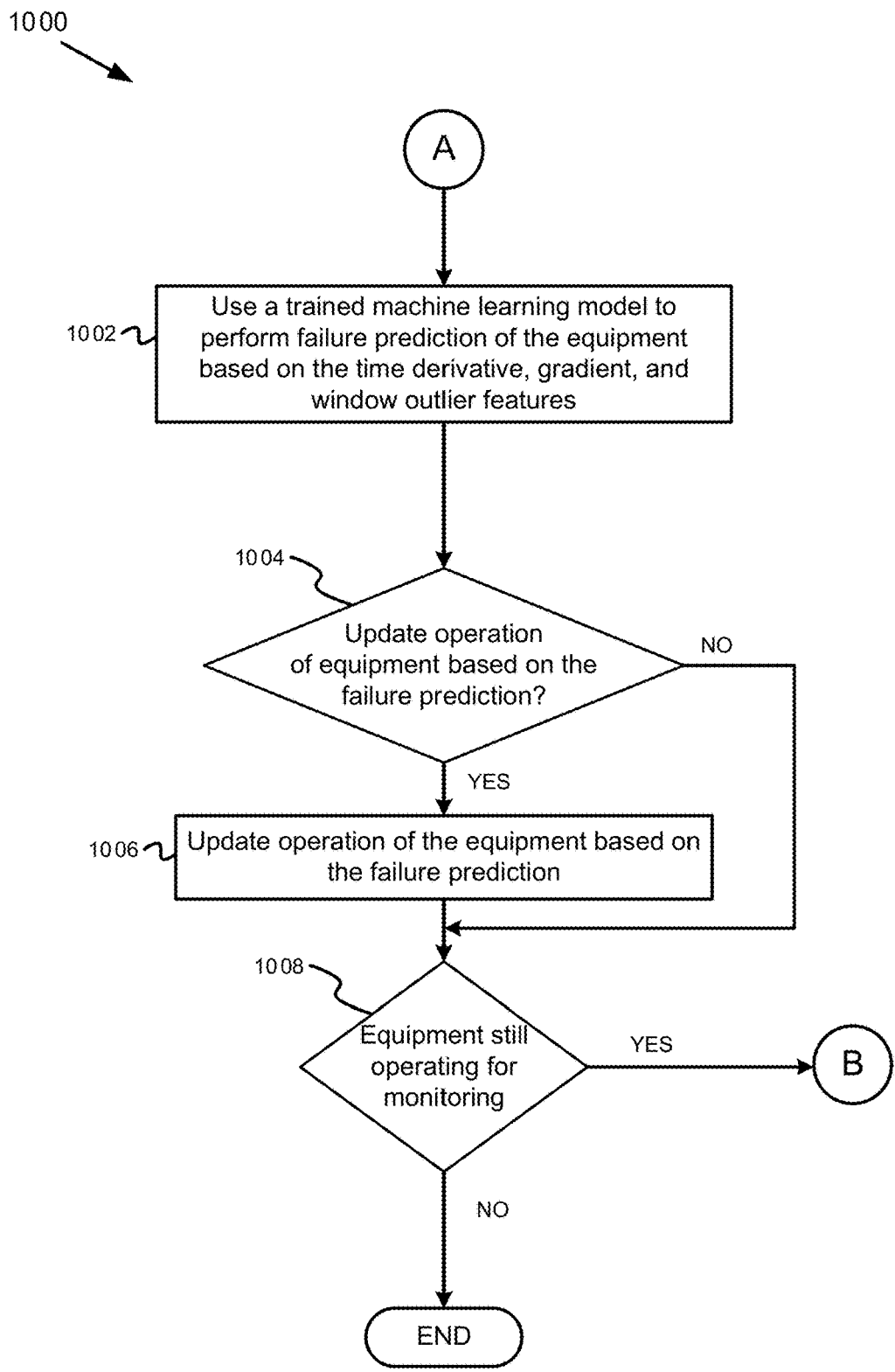

FIGS. 9-10 depict a flowchart of example operations for using a trained machine learning model for failure prediction of equipment using time derivative and gradient features of operational parameters of the equipment, according to some embodiments. Operations of flowcharts 900-1000 of FIGS. 9-10 continue through transition points A and B. Operations of the flowcharts 900-1000 can be performed by software, firmware, hardware or a combination thereof. Such operations are described with reference to the system 100 of FIG. 1. However, such operations can be performed by other systems or components. For example, some of all of the operations can be performed by a processor downhole in the wellbore. The operations of the flowchart 900 start at block 902.

At block 902, data values of operational parameters of equipment or device are received. For example, with reference to FIG. 1, the processor of the computer 110 can receive (via the communication path 112) a periodic time series of data values for different operational parameters of the ESP 102 from the sensors of the ESP 102. For instance, the processor can receive periodic data values of operational parameters such as pump inlet pressure, pump discharge pressure, flow rates, level of current of the motor, temperature of the motor and pump, etc. For example, the processor can receive a data value for operational parameter A every second, receive a data value for operational parameter B every minute, etc.

At block 904, outlier features are identified within the data values. For example, with reference to FIG. 1, the processor of the computer 110 can identify the outlier features for a given window of time. Such identification can help understand the time dependency of the data values in a given window. Example operations of identifying outlier features are described in more detail above in reference to FIGS. 7-8.

At block 906, outlier features are removed from the data values. For example, with reference to FIG. 1, the processor of the computer 110 can remove the outlier features. In some embodiments, the processor can remove one or more of the outlier features identified at block 904.

At block 908, data values are normalized. For example, with reference to FIG. 1, the processor of the computer 110 can normalize the data values in each of the time series. Removal of outlier features and data normalization are two examples of data cleaning of the data values. Other types of data cleaning (such as inserting missing values from the time series) can also be performed to identify and correct inaccurate data from the time series.

At block 910, time derivative features for a machine learning model are generated for the time series and are derived from the data values of the operational parameters. For example, with reference to FIG. 1, the processor of the computer 110 can generate the time derivative features. In some embodiments, the time derivative features can be a change in a given operational parameter over a given time period (as described above). For example, a time derivative feature can be a change in the pump inlet pressure over the change in time for a given window of time. The processor can generate one or more time derivative features depending on the type of equipment, type of operation, length of time of operation of the equipment, etc.

At block 912, gradient features for the machine learning model are generated for the time series and are derived from the data values of the operational parameters. For example, with reference to FIG. 1, the processor of the computer 110 can generate the gradient features. In some embodiments, the gradient features can be a given operational parameter changes as compared to a different operational parameter over a given time period. For example, a gradient feature can be change in the pump inlet pressure over the change the pump speed.

At block 914, outlier features for a time window are determined. For example, with reference to FIG. 1, the processor of the computer 110 can make this determination. An example of determining outlier features for a time window is further described above in reference to FIG. 7-8.

At block 916, the time derivative features are encoded based on the amount of change over time of the operational parameter. For example, with reference to FIG. 1, the processor of the computer 110 can encode the time derivative features. An example of such encoding of time derivative features is described above in reference to FIG. 6.

At block 918, the gradient features are encoded based on the amount of change of the operational parameter as compared to a different operational parameter. For example, with reference to FIG. 1, the processor of the computer 110 can encode the gradient features. An example of such encoding of the gradient features is described above in reference to FIG. 6. Operations of the flowchart 900 continue at transition point A, which continues at transition point A of the flowchart 1000. From the transition point A of the flowchart 1000 operations continue at block 1002.

At block 1002, a trained machine learning model is used to perform failure prediction of the equipment based on the time derivative, gradient, and window outlier features. For example, with reference to FIG. 1, the processor of the computer 110 can perform this operation using a machine learning model trained based on operations of the flowchart depicted in FIGS. 4-5. In some embodiments, an output from the trained machine learning model can be a failure mode category that comprises at least one of stable, unstable, pre-failure, and failure.

At block 1004, a determination is made of whether operation of the equipment is to be updated based on the failure prediction. For example, with reference to FIG. 1, the processor of the computer 110 can make this determination. For instance, if the equipment is in a category of failure, the equipment can be shut down. In another example, if the equipment is in a category of unstable or pre-failure, operations can be adjusted to minimize or correct problems in the operation of the equipment. For instance, if the equipment is a pump whose operation is in pre-failure, operation can be updated to reduce the pump rate, inlet pressure, outlet pressure, etc. If operation of the equipment does not need to be updated, operations of the flowchart 1000 continue at block 1008 (which is further described below). If operations of the equipment do need to be updated, operations of the flowchart 1000 continue at block 1006.

At block 1106, operation of the equipment is updated based on the failure prediction. For example, with reference to FIG. 1, the processor of the computer 110 can update operation of the equipment. For instance, the processor can communicate to a controller of the equipment or to the equipment itself to modify operation of the equipment.

At block 1008, a determination is made of whether the equipment is still operating for monitoring. For example, with reference to FIG. 1, the processor of the computer 110 can make this determination. If the equipment is still operating for monitoring, operations of the flowchart 1000 continue at transition point B, which continues at transition point B of the flowchart 900, where more time series data values are received at block 902. Otherwise, operations of the flowchart 1000 are complete.

Example Operations—Data Augmentation Based on Time Windows Having Varying Time Intervals for Data Capture Some failures can occur very fast while others can occur much slower. Some embodiments incorporate data augmentation that includes data windows whose data is captured at varying intervals. Such data augmentation can allow for better detection of failures occurring at different rates (e.g., fast failing, slow failing, etc.). Thus, data regarding operational parameter(s) can be captured at varying time intervals. For example, for window A, data is captured every second; for window B, data is captured every 30 seconds; for window C can have a length of every five minutes, etc. Accordingly, example embodiments can have different time windows for the same data values of operational parameters, wherein each time window can have different time intervals for data capture. Such embodiments can allow enable detection of failures that fail at different rates (e.g., fast failing, slow failing, etc.).

Figure 11:
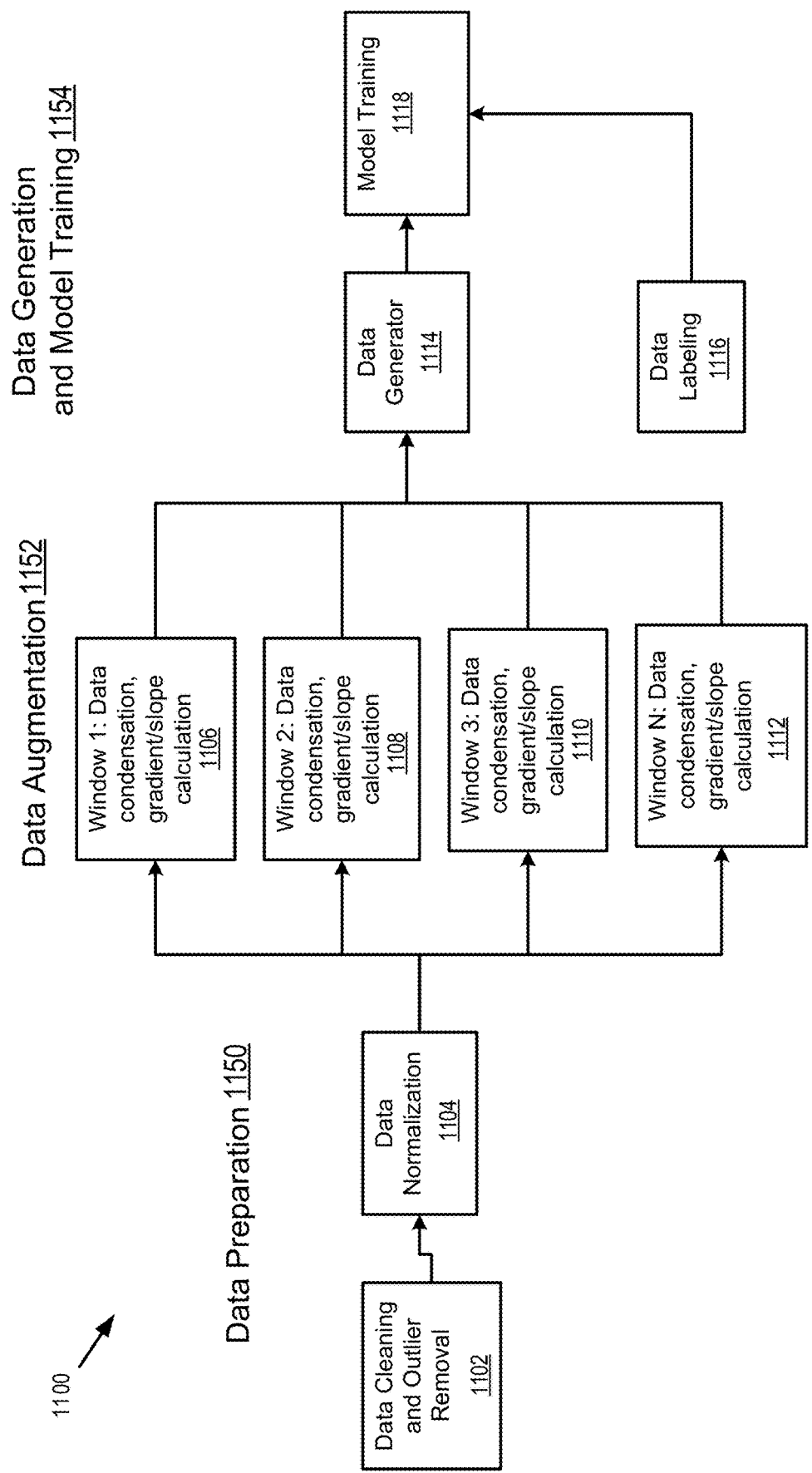
FIG. 11 depicts a data flow diagram for training a machine learning model for failure prediction of equipment using data augmentation based on time windows having varying time intervals for data capture, according to some embodiments.

FIG. 11 depicts a data flow diagram for training a machine learning model for failure prediction of equipment using data augmentation based on time windows having varying time intervals for data capture, according to some embodiments. A data flow diagram 1100 includes three stages—a data preparation stage 1150, a data augmentation stage 1152, and a data generation and model training stage 1154.

At the data preparation stage 1150, the time series data that is received can be cleaned and any outliers can be removed (1102). This data can then be normalized (1104). At the data augmentation stage 1152, this same set of data can be input into a number of different time windows (1-N), wherein each time window has a different time interval. In this example, the data augmentation stage 1152 includes window 1 (1106), window 2 (1108), window 3 (1110), and window N (1112). Each window can have a different sampling interval of the same set of data. Also, the data can be values for one or more operational parameters of the equipment. For example, window 1 can have a sampling interval of one second, window 2 can have a sampling interval of 1 minute, window 3 can have a sampling interval of 24 hours, and window N can have a sampling interval of 30 days. Additionally, as described above in reference to the operations of FIGS. 5-6, the data values can be different features that can include time derivative features, gradient features, and outlier features). In some embodiments, the data values in each window can be condensed to a reduced data set using different condensing operations. For example, every N number of data values of M total data values in the window can be averaged to create one value for each of the N number of data values in the window. In some embodiments, a gradient or slope can also be calculated for the data values in the time window.

At the data preparation and model training stage 1154, the data from the different time windows can be input into a data generator 1114 to generate data that is to be used for training a machine learning model to predict equipment failure (both fast and slow) (1118). In some embodiments, time series generators can be used to generate the data to be input into the model. Additionally, the features in these data values can be labeled (1116) with regard to various types of failure modes to provide for classification of data into failure mode categories (such as stable, unstable, pre-failure, failure, etc.). These data labels can also be input into the model training 1118.

Figure 12:
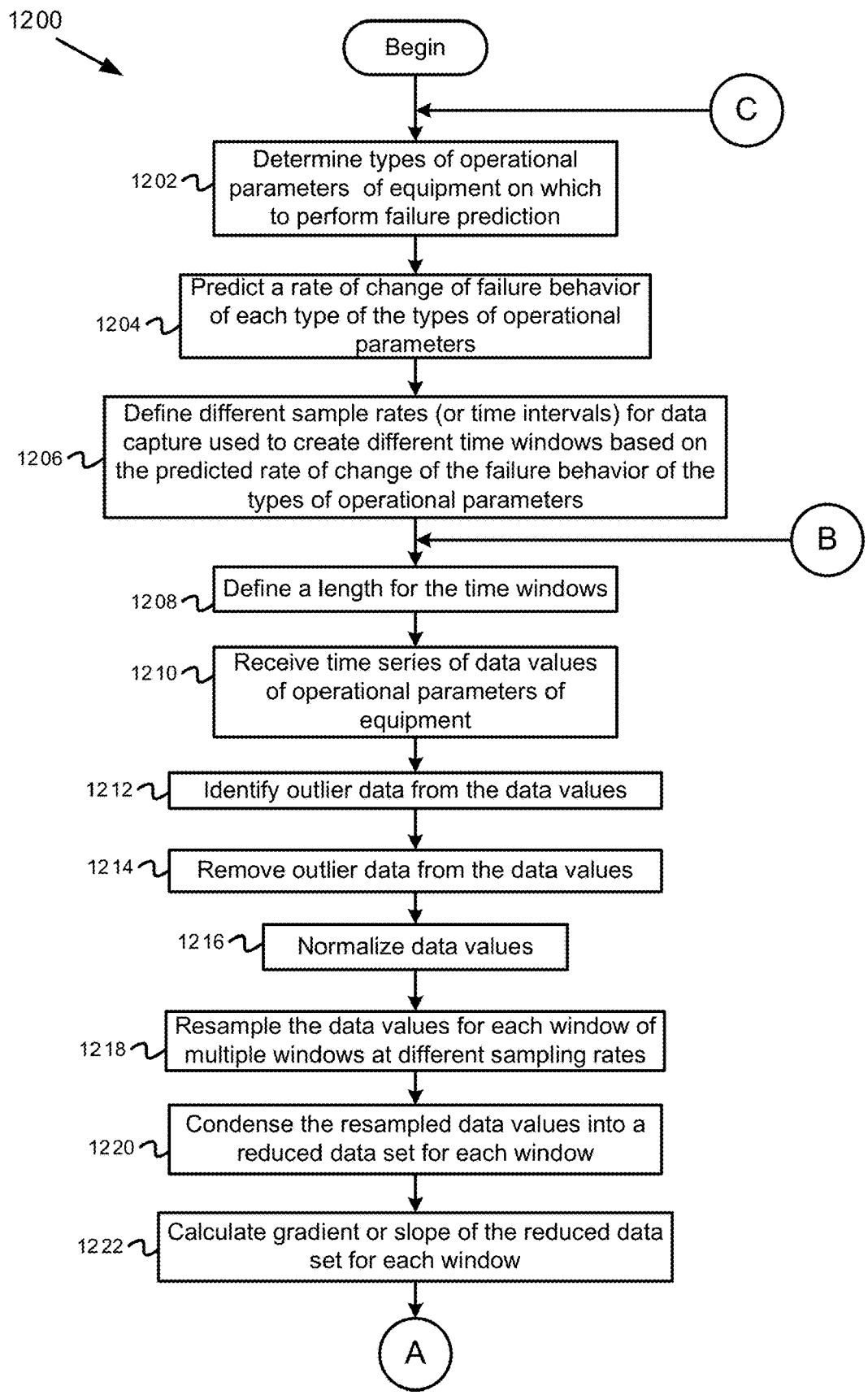
FIGS. 12-13 depict a flowchart of example operations for training a machine learning model for failure prediction of equipment using data augmentation based on time windows having varying time intervals for data capture, according to some embodiments.
Figure 13:
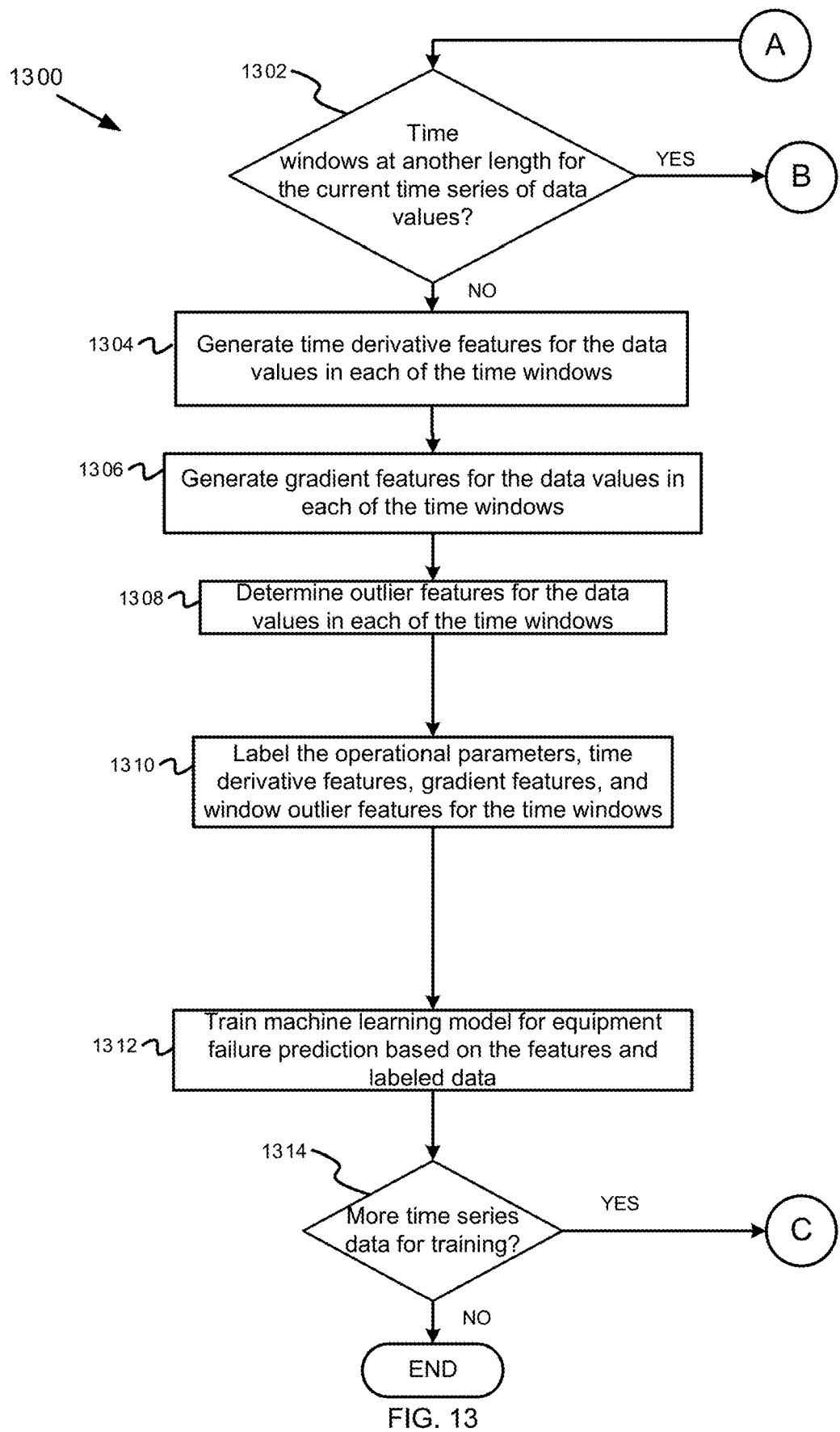

To further illustrate, FIGS. 12-13 depict a flowchart of example operations for training a machine learning model for failure prediction of equipment using data augmentation based on time windows having varying time intervals for data capture, according to some embodiments. Operations of flowcharts 1200-1300 of FIGS. 12-13 continue through transition points A, B, and C. Operations of the flowcharts 1200-1300 can be performed by software, firmware, hardware or a combination thereof. Such operations are described with reference to the system 100 of FIG. 1. However, such operations can be performed by other systems or components. For example, some of all of the operations can be performed by a processor downhole in the wellbore. The operations of the flowchart 1200 start at block 1202.

At block 1202, the types of operational parameters of equipment on which to perform failure prediction is determined. For example, with reference to FIG. 1, the processor of the computer 110 can make this determination.

At block 1204, a rate of change of failure behavior of each type of the types of operational parameters is determined. For example, with reference to FIG. 1, the processor of the computer 110 can make this determination.

At block 1206, different sample rates (or time intervals) for data capture used to create different time windows are defined based on the predicted rate of change of the failure behavior of the types of operational parameters. For example, with reference to FIG. 1, the processor of the computer 110 can define these sample rates.

At block 1208, a length of the time windows is defined. For example, with reference to FIG. 1, the processor of the computer 110 can define this length. In particular, the operations for creating resampled data values across multiple windows having the defined length. Such operations can be re-executed for a different length for the time windows. Because the different types of failures can have different behavior (some drastic and others gradual), these operations can be performed for various window lengths.

At block 1210, data values of operational parameters of equipment or device are received. For example, with reference to FIG. 1, the processor of the computer 110 can receive (via the communication path 112) a periodic time series of data values for different operational parameters of the ESP 102 from the sensors of the ESP 102. For instance, the processor can receive periodic data values of operational parameters such as pump inlet pressure, pump discharge pressure, flow rates, level of current of the motor, temperature of the motor and pump, etc. For example, the processor can receive a data value for operational parameter A every second, receive a data value for operational parameter B every minute, etc.

At block 1212, outlier features are identified within the data values. For example, with reference to FIG. 1, the processor of the computer 110 can identify the outlier features for a given window of time. Such identification can help understand the time dependency of the data values in a given window. Example operations of identifying outlier features are described in more detail above in reference to FIGS. 7-8.

At block 1214, outlier features are removed from the data values. For example, with reference to FIG. 1, the processor of the computer 110 can remove the outlier features. In some embodiments, the processor can remove one or more of the outlier features identified at block 1212.

At block 1216, data values are normalized. For example, with reference to FIG. 1, the processor of the computer 110 can normalize the data values in each of the time series. Removal of outlier features and data normalization are two examples of data cleaning of the data values. Other types of data cleaning (such as inserting missing values from the time series) can also be performed to identify and correct inaccurate data from the time series.

At block 1218, the data values for each window of the multiple windows are resampled at a different sampling rate. For example, with reference to FIG. 1, the processor of the computer 110 can resample the data values based on the sampling rates defined at block 1206, such that each window is resampled at a different sampling rate.

At block 1220, the resampled data values for each window of the multiple windows are condensed into a reduced data set. For example, with reference to FIG. 1, the processor of the computer 110 can condense the resampled data values for each window into a reduced data set.

At block 1222, a gradient or slope of the reduced data set is calculated for each window. For example, with reference to FIG. 1, the processor of the computer 110 can perform this calculation. Operations of the flowchart 1200 continue at transition point A, which continues at transition point A of the flowchart 1300. From the transition point A of the flowchart 1300 operations continue at block 1302.

At block 1302, a determination is made of whether time windows at additional lengths (not yet used) for the current time series of data values need to be generated. For example, with reference to FIG. 1, the processor of the computer 110 can perform this determination. More than one length of the time windows can be used for the resampling of the current time series of data values. The number of lengths and the values of the lengths can vary depending on various factors (such as the type of equipment, the type of operational parameters, the type of application for which the equipment is being used, etc.). If time windows at another length need to be created for resampling the current time series of data values, operations of the flowchart 1300 continue at transition point B, which continues at transition point B of the flowchart 1200 (where another length of the time windows is defined). Otherwise, operations of the flowchart 1300 continue at block 1304.

At block 1304, time derivative features are generated for the data values in each of the time windows. For example, with reference to FIG. 1, the processor of the computer 110 can generate the time derivative features. As described above, the time derivative features can be a change in a given operational parameter over a given time period. For example, a time derivative feature can be a change in the pump inlet pressure over the change in time for a given window of time.

At block 1306, gradient features are generated for the data values in each of the time windows. For example, with reference to FIG. 1, the processor of the computer 110 can generate the gradient features. As described above, the gradient features can be a given operational parameter changes as compared to a different operational parameter over a given time period. For example, a gradient feature can be change in the pump inlet pressure over the change the pump speed.

At block 1308, outlier features for each time window are determined. For example, with reference to FIG. 1, the processor of the computer 110 can make this determination. An example of determining outlier features for a time window is further described above in reference to FIG. 7-8.

At block 1310, the data values (including the operational parameters, time derivative features, gradient features, and window outlier features) for time windows are labeled. For example, with reference to FIG. 1, the processor of the computer 110 can perform the labeling. The labeling can be different values for failure prediction. For example, the labeling can be indicative of different operational modes of the equipment, such as stable, unstable, pre-failure, failure, etc. In some embodiments, pattern recognition can be used for data labelling.

At block 1312, a machine learning model is trained for equipment failure prediction based on the features and labeled data. For example, with reference to FIG. 1, the processor of the computer 110 can perform the training of a machine learning model. Different machine learning models (e.g., neural networks, random forests, support vector machines, boosting methods, recurrent neural networks (RNNs) (such as long short-term memory (LSTM) and gated recurrent unit (GRU)), etc.) can be used for classification. In some embodiments, a model can be trained based on data for each time window separately. Additionally, a model can also be trained using combined data that is combined across the different time windows. An example of using the combined data for training is depicted in FIG. 14 (which is further described below).

At block 1314, a determination is made of whether there are more time series data values to be processed for training. For example, with reference to FIG. 1, the processor of the computer 110 can make this determination. If there are more time series data values to be processed for training, operations of the flowchart 1300 continue at transition point C, which continues at transition point C of the flowchart 1200. Otherwise, operations of the flowchart 1300 are complete.

Figure 14:
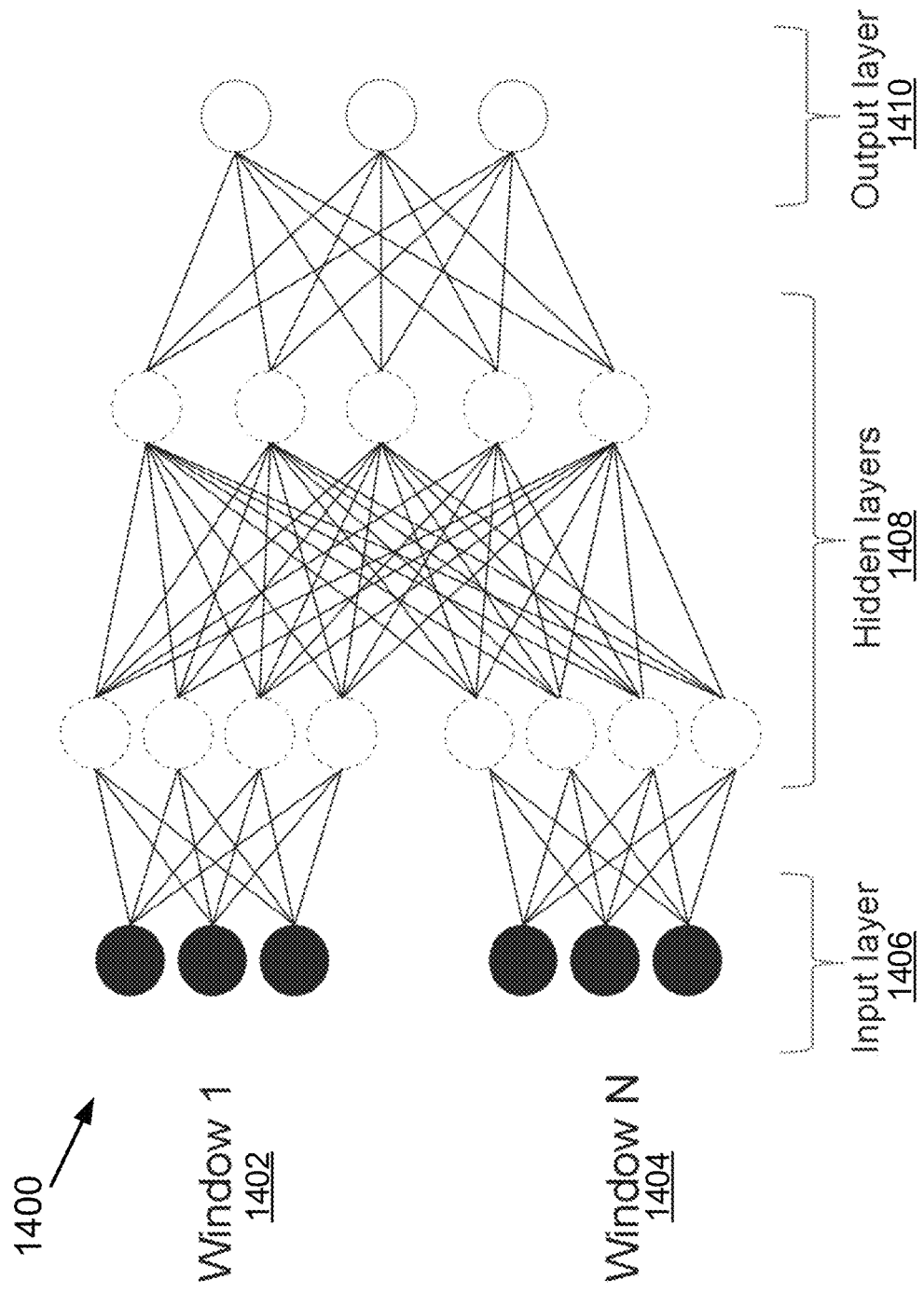
FIG. 14 depicts an example neural network to model using multi window inputs and multi outputs, according to some embodiments.

FIG. 14 depicts an example neural network to model using multi window inputs and multi outputs, according to some embodiments. A neural network 1400 includes an input layer 1406, hidden layers 1408, and an output layer 1410. As shown, there can be multiple instances of the windows at their different sampling rates. In this example, a window 1 (1402) and a window N (1404) both include three instances (which can be at varying sampling rates and lengths) that are input into the input layer 1406. While FIG. 14 only depicts two different windows, any number of windows can be input into the neural network 1400. The input layer 1406 creates a combination of data values for each of the window 1 (1402) and the window N (1404). These combinations can be input into the hidden layers 1408. The hidden layers 1408 can combine the data across the different instances of the window 1 (1402) and window N (1404). This data can then be input to the output layer 1410 which provides the output. This output can be mapped to the data labels provided that can be compared to the labeling to classifications based on the labels provided. Such mapping can identify any errors that can be input back into the hidden layers 1408. The output of the neural network 1400 can then be classification on the data values based on the data labeling. In this example, there can be multiple window inputs and multiple outputs.

Figure 15:
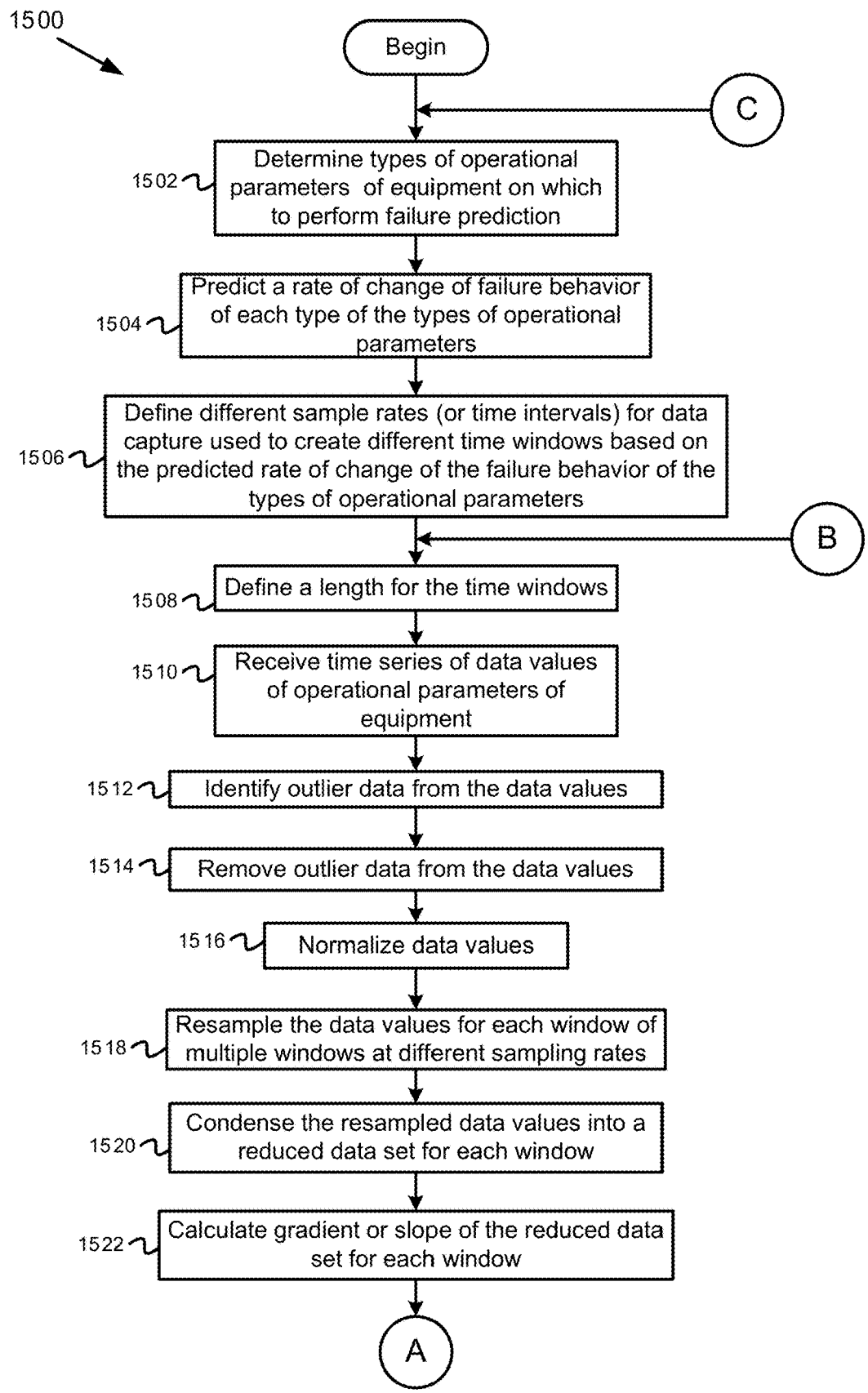
FIGS. 15-16 depict a flowchart of example operations for using a machine learning model for failure prediction of equipment using data augmentation based on time windows having varying time intervals for data capture, according to some embodiments.
Figure 16:
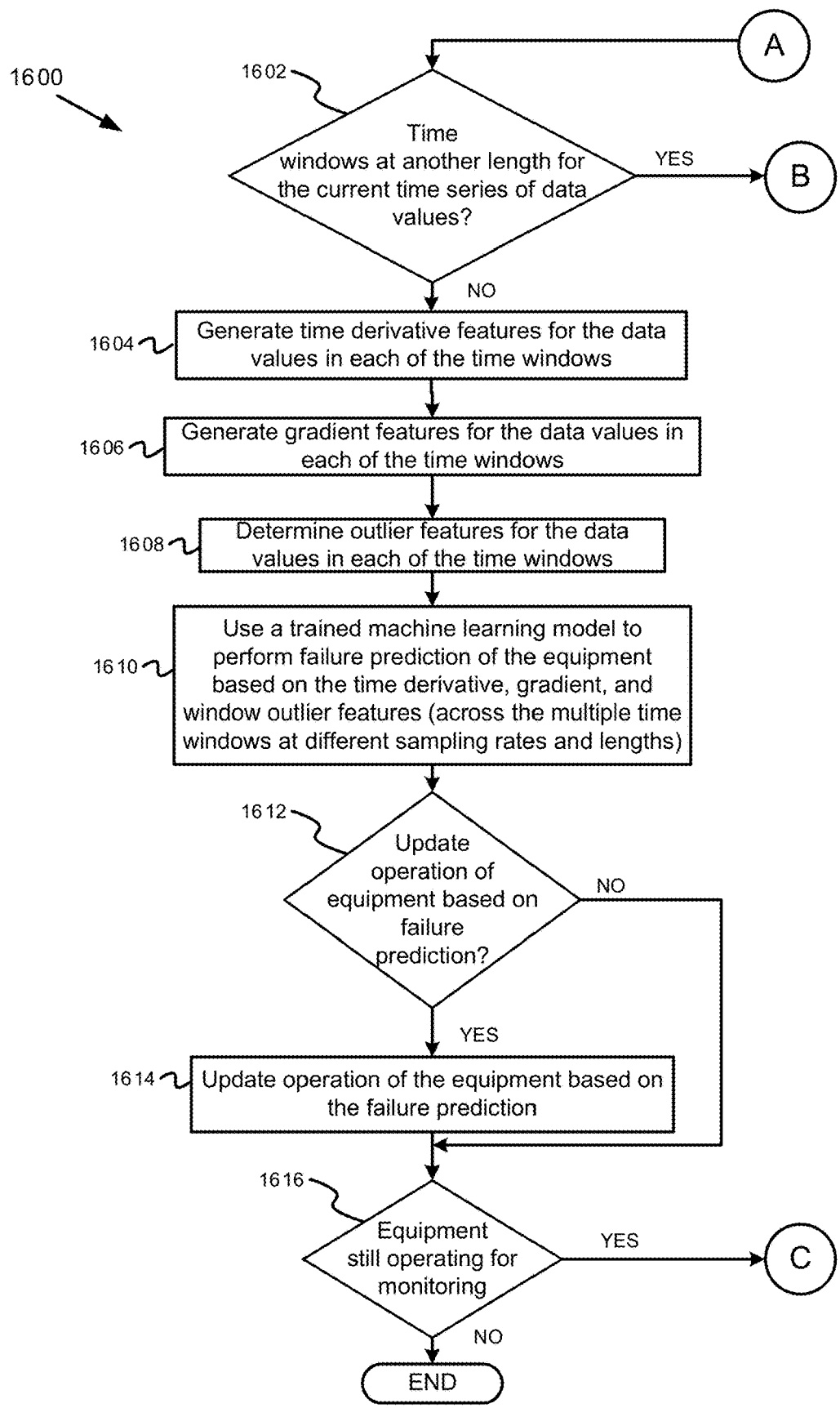

FIGS. 15-16 depict a flowchart of example operations for using a machine learning model for failure prediction of equipment using data augmentation based on time windows having varying time intervals for data capture, according to some embodiments.

Operations of flowcharts 1500-1600 of FIGS. 15-16 continue through transition points A, B, and C. Operations of the flowcharts 1500-1600 can be performed by software, firmware, hardware or a combination thereof. Such operations are described with reference to the system 100 of FIG. 1. However, such operations can be performed by other systems or components. For example, some of all of the operations can be performed by a processor downhole in the wellbore. The operations of the flowchart 1500 start at block 1502.

At block 1502, the types of operational parameters of equipment on which to perform failure prediction is determined. For example, with reference to FIG. 1, the processor of the computer 110 can make this determination.

At block 1504, a rate of change of failure behavior of each type of the types of operational parameters is determined. For example, with reference to FIG. 1, the processor of the computer 110 can make this determination.

At block 1506, different sample rates (or time intervals) for data capture used to create different time windows are defined based on the predicted rate of change of the failure behavior of the types of operational parameters. For example, with reference to FIG. 1, the processor of the computer 110 can define these sample rates.

At block 1508, a length of the time windows is defined. For example, with reference to FIG. 1, the processor of the computer 110 can define this length. In particular, the operations for creating resampled data values across multiple windows having the defined length. Such operations can be re-executed for a different length for the time windows. Because the different types of failures can have different behavior (some drastic and others gradual), these operations can be performed for various window lengths.

At block 1510, data values of operational parameters of equipment or device are received. For example, with reference to FIG. 1, the processor of the computer 110 can receive (via the communication path 112) a periodic time series of data values for different operational parameters of the ESP 102 from the sensors of the ESP 102. For instance, the processor can receive periodic data values of operational parameters such as pump inlet pressure, pump discharge pressure, flow rates, level of current of the motor, temperature of the motor and pump, etc. For example, the processor can receive a data value for operational parameter A every second, receive a data value for operational parameter B every minute, etc.

At block 1512, outlier features are identified within the data values. For example, with reference to FIG. 1, the processor of the computer 110 can identify the outlier features for a given window of time. Such identification can help understand the time dependency of the data values in a given window. Example operations of identifying outlier features are described in more detail above in reference to FIGS. 7-8.

At block 1514, outlier features are removed from the data values. For example, with reference to FIG. 1, the processor of the computer 110 can remove the outlier features. In some embodiments, the processor can remove one or more of the outlier features identified at block 1512.

At block 1516, data values are normalized. For example, with reference to FIG. 1, the processor of the computer 110 can normalize the data values in each of the time series. Removal of outlier features and data normalization are two examples of data cleaning of the data values. Other types of data cleaning (such as inserting missing values from the time series) can also be performed to identify and correct inaccurate data from the time series.

At block 1518, the data values for each window of the multiple windows are resampled at a different sampling rate. For example, with reference to FIG. 1, the processor of the computer 110 can resample the data values based on the sampling rates defined at block 1506, such that each window is resampled at a different sampling rate.

At block 1520, the resampled data values for each window of the multiple windows are condensed into a reduced data set. For example, with reference to FIG. 1, the processor of the computer 110 can condense the resampled data values for each window into a reduced data set.

At block 1522, a gradient or slope of the reduced data set is calculated for each window. For example, with reference to FIG. 1, the processor of the computer 110 can perform this calculation. Operations of the flowchart 1500 continue at transition point A, which continues at transition point A of the flowchart 1600. From the transition point A of the flowchart 1600 operations continue at block 1602.

At block 1602, a determination is made of whether time windows at additional lengths (not yet used) for the current time series of data values need to be generated. For example, with reference to FIG. 1, the processor of the computer 110 can perform this determination. More than one length of the time windows can be used for the resampling of the current time series of data values. The number of lengths and the values of the lengths can vary depending on various factors (such as the type of equipment, the type of operational parameters, the type of application for which the equipment is being used, etc.). If time windows at another length need to be created for resampling the current time series of data values, operations of the flowchart 1600 continue at transition point B, which continues at transition point B of the flowchart 1500 (where another length of the time windows is defined). Otherwise, operations of the flowchart 1600 continue at block 1604.

At block 1604, time derivative features are generated for the data values in each of the time windows. For example, with reference to FIG. 1, the processor of the computer 110 can generate the time derivative features. As described above, the time derivative features can be a change in a given operational parameter over a given time period. For example, a time derivative feature can be a change in the pump inlet pressure over the change in time for a given window of time.

At block 1606, gradient features are generated for the data values in each of the time windows. For example, with reference to FIG. 1, the processor of the computer 110 can generate the gradient features. As described above, the gradient features can be a given operational parameter changes as compared to a different operational parameter over a given time period. For example, a gradient feature can be change in the pump inlet pressure over the change the pump speed.

At block 1608, outlier features for each time window are determined. For example, with reference to FIG. 1, the processor of the computer 110 can make this determination. An example of determining outlier features for a time window is further described above in reference to FIG. 7-8.

At block 1610, a trained machine learning model is used to perform failure prediction of the equipment based on the time derivative, gradient, and window outlier features (across the multiple time windows at different sampling rates and lengths). For example, with reference to FIG. 1, the processor of the computer 110 can perform this operation using a machine learning model trained based on operations of the flowchart depicted in FIGS. 12-13. In some embodiments, an output from the trained machine learning model can be a failure mode category that comprises at least one of stable, unstable, pre-failure, and failure.

At block 1612, a determination is made of whether operation of the equipment is to be updated based on the failure prediction. For example, with reference to FIG. 1, the processor of the computer 110 can make this determination. For instance, if the equipment is in a category of failure, the equipment can be shut down. In another example, if the equipment is in a category of unstable or pre-failure, operations can be adjusted to minimize or correct problems in the operation of the equipment. For instance, if the equipment is a pump whose operation is in pre-failure, operation can be updated to reduce the pump rate, inlet pressure, outlet pressure, etc. If operation of the equipment does not need to be updated, operations of the flowchart 1600 continue at block 1616 (which is further described below). If operations of the equipment do need to be updated, operations of the flowchart 1600 continue at block 1614.

At block 1614, operation of the equipment is updated based on the failure prediction. For example, with reference to FIG. 1, the processor of the computer 110 can update operation of the equipment. For instance, the processor can communicate to a controller of the equipment or to the equipment itself to modify operation of the equipment.

At block 1616, a determination is made of whether the equipment is still operating for monitoring. For example, with reference to FIG. 1, the processor of the computer 110 can make this determination. If the equipment is still operating for monitoring, operations of the flowchart 1600 continue at transition point C, which continues at transition point C of the flowchart 1500. Otherwise, operations of the flowchart 1600 are complete.

The flowcharts are annotated with a series of numbers. These represent stages of operations. Although these stages are ordered for this example, the stages illustrate one example to aid in understanding this disclosure and should not be used to limit the claims. Subject matter falling within the scope of the claims can vary with respect to the order and some of the operations.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device. Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Example Computer

Figure 17:
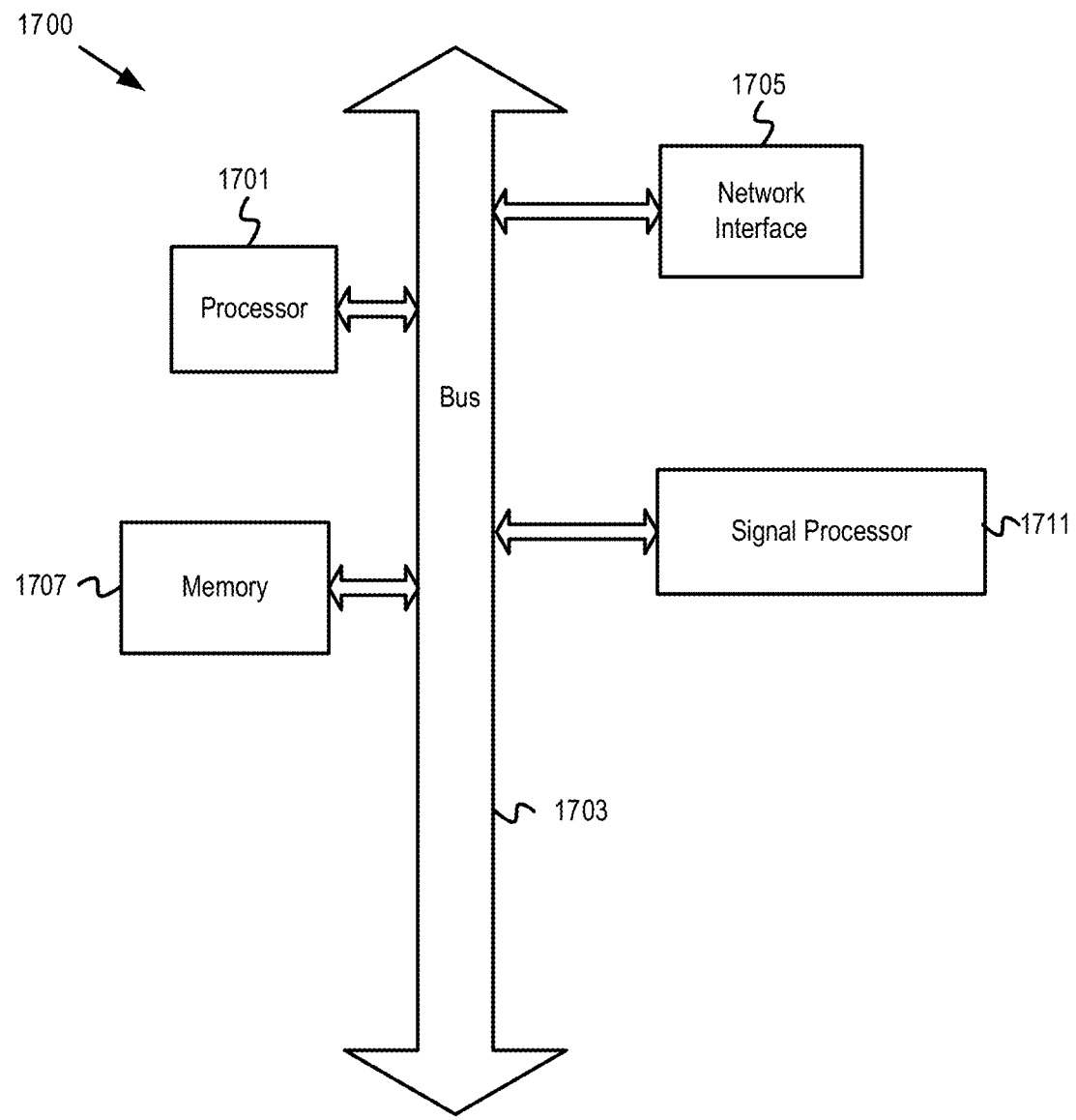
FIG. 17 depicts an example computer, according to some embodiments.

FIG. 17 depicts an example computer, according to some embodiments. In particular, FIG. 17 depicts a computer 1700 that includes a processor 1701 (possibly including multiple processors, multiple cores, multiple nodes, and/or implementing multi-threading, etc.). The computer 1700 includes a memory 1707. The memory 1707 may be system memory or any one or more of the above already described possible realizations of machine-readable media. The computer 1700 also includes a bus 1703 and a network interface 1705.

The computer 1700 also includes a signal processor 1711. The signal processor 1711 can perform some or all of the functionalities for failure prediction of equipment, modifying equipment operations, etc. (as described above). Any one of the previously described functionalities may be partially (or entirely) implemented in hardware and/or on the processor 1701. For example, the functionality may be implemented with an application specific integrated circuit, in logic implemented in the processor 1701, in a co-processor on a peripheral device or card, etc. Further, realizations may include fewer or additional components not illustrated in FIG. 17 (e.g., video cards, audio cards, additional network interfaces, peripheral devices, etc.). The processor 1701 and the network interface 1705 are coupled to the bus 1703. Although illustrated as being coupled to the bus 1703, the memory 1707 may be coupled to the processor 1701.

While the aspects of the disclosure are described with reference to various implementations and exploitations, it will be understood that these aspects are illustrative and that the scope of the claims is not limited to them. In general, techniques for failure prediction as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Example Embodiments

Embodiment 1: A method comprising: receiving a time series of data values for a time window of each operational parameter of a number of operational parameters of equipment; calculating a time derivative feature that comprises a change of the data values of a first operational parameter of the number of operational parameters over the time window; and classifying, using a machine learning model and based on the time derivative feature, an operational mode of the equipment into different failure categories.

Embodiment 2: The method of Embodiment 1, further comprising: calculating a gradient feature that comprises a change of the data values of a second operational parameter of the number of operational parameters relative to a change of the data values of a third operational parameter of the number of operational parameters over the time window, wherein classifying the operational mode of the equipment comprises classifying, using the machine learning model and based on the gradient feature, the operational mode of the equipment.

Embodiment 3: The method of Embodiment 2, further comprising: encoding the time derivative feature based on an amount of change over time of the value of the first operational parameter; and encoding the gradient feature based on an amount of the change of the value of the second operational parameter relative to an amount of the change of the value of the third operational parameter, wherein classifying the operational mode comprises classifying, using the machine learning model and based on the encoded time derivative feature and the encoded gradient feature, the operational mode of the equipment into the different failure categories.

Embodiment 4: The method of Embodiment 3, wherein encoding the time derivative feature comprises, in response to the change over time of the value of the first operational parameter increasing greater than a drastic time increase threshold, encoding the time derivative feature as a drastic time increase; in response to the change over time of the value of the first operational parameter decreasing greater than a drastic time decrease threshold, encoding the time derivative feature as a drastic time decrease; in response to the change over time of the value of the first operational parameter increasing less than a minor time increase threshold, encoding the time derivative feature as a minor time increase; in response to the change over time of the value of the first operational parameter decreasing less than a minor time decrease threshold, encoding the time derivative feature as a minor time decrease; and in response to the change over time of the value of the first operational parameter changing less than a constant time threshold, encoding the time derivative feature as a constant.

Embodiment 5: The method of Embodiment 4, wherein encoding the gradient feature comprises, in response to an increase of the value of the parameter relative to the value of the different parameter being greater than a large gradient increase threshold, encoding the gradient as a major gradient increase; in response to a decrease of the value of the parameter relative to the value of the different parameter being greater than a large gradient decrease threshold, encoding the gradient as a major gradient decrease; in response to the increase of the value of the parameter relative to the value of the different parameter being less than a small gradient increase threshold, encoding the gradient as a minor gradient increase; in response to the decrease of the value of the parameter relative to the value of the different parameter being less than a small gradient decrease threshold, encoding the gradient as a minor gradient decrease; and in response to the change of the value of the parameter relative to the value of the different parameter changing less than a constant gradient threshold, encoding the gradient as a constant.

Embodiment 6: The method of any one of Embodiments 1-5, further comprising: determining outlier features of data values for the time window, wherein classifying the operational mode of the equipment comprises classifying, using the machine learning model and based on the outlier features, the operational mode of the equipment.

Embodiment 7: The method of any one of Embodiments 1-6, wherein the equipment comprises an electrical submersible pump.

Embodiment 8: The method of any one of Embodiments 1-7, further comprising: modifying the operation of the equipment in response to the classifying the operational mode of the equipment.

Embodiment 9: The method of any one of Embodiments 1-8, wherein the different failure categories comprise at least one of stable, unstable, pre-failure, and failure.

Embodiment 10: A system comprising: downhole equipment to be positioned in a wellbore; a number of sensors that are to measure a number of operational parameters of the downhole equipment; a processor; and a computer-readable medium having instructions stored thereon that are executable by the processor to cause the processor to, receive a time series of data values for a time window of each operational parameter of the number of operational parameters; calculate a time derivative feature that comprises a change of the data values of a first operational parameter of the number of operational parameters over the time window; and classify, using a machine learning model and based on the time derivative feature, an operational mode of the equipment into different failure categories.

Embodiment 11: The system of Embodiment 10, wherein the instructions comprise instructions executable by the processor to cause the processor to: calculate a gradient feature that comprises a change of the data values of a second operational parameter of the number of operational parameters relative to a change of the data values of a third operational parameter of the number of operational parameters over the time window, wherein the instructions to classify the operational mode of the equipment comprises instructions executable by the processor to cause the processor to classify, using the machine learning model and based on the gradient feature, the operational mode of the equipment.

Embodiment 12: The system of Embodiment 11, wherein the instructions comprise instructions executable by the processor to cause the processor to: encode the time derivative feature based on an amount of change over time of the value of the first operational parameter; and encode the gradient feature based on an amount of the change of the value of the second operational parameter relative to an amount of the change of the value of the third operational parameter, wherein the instructions to classify the operational mode of the equipment comprises instructions executable by the processor to cause the processor to classify, using the machine learning model and based on the encoded time derivative feature and the encoded gradient feature, the operational mode of the equipment into the different failure categories.

Embodiment 13: The system of any one of Embodiments 10-12, wherein the instructions comprise instructions executable by the processor to cause the processor to: determine outlier features of data values for the time window, wherein the instructions to classify the operational mode of the equipment comprises instructions executable by the processor to cause the processor to classify, using the machine learning model and based on the outlier features, the operational mode of the equipment.

Embodiment 14: The system of any one of Embodiments 10-13, wherein the equipment comprises an electrical submersible pump.

Embodiment 15: The system of any one of Embodiments 10-14, wherein the instructions comprise instructions executable by the processor to cause the processor to modify the operation of the equipment in response to the classifying the operational mode of the equipment.

Embodiment 16: The system of any one of Embodiments 10-15, wherein the different failure categories comprise at least one of stable, unstable, pre-failure, and failure.

Embodiment 17: A non-transitory, computer-readable medium having instructions stored thereon that are executable by a processor to perform operations comprising: receiving a time series of data values for a time window of each operational parameter of a number of operational parameters of equipment; calculating a time derivative feature that comprises a change of the data values of a first operational parameter of the number of operational parameters over the time window; and classifying, using a machine learning model and based on the time derivative feature, an operational mode of the equipment into different failure categories.

Embodiment 18: The non-transitory, computer-readable medium of Embodiment 17, wherein the operations comprise: calculating a gradient feature that comprises a change of the data values of a second operational parameter of the number of operational parameters relative to a change of the data values of a third operational parameter of the number of operational parameters over the time window, wherein classifying the operational mode of the equipment comprises classifying, using the machine learning model and based on the gradient feature, the operational mode of the equipment.

Embodiment 19: The non-transitory, computer-readable medium of Embodiment 18, wherein the operations comprise: encoding the time derivative feature based on an amount of change over time of the value of the first operational parameter; and encoding the gradient feature based on an amount of the change of the value of the second operational parameter relative to an amount of the change of the value of the third operational parameter, wherein classifying the operational mode comprises classifying, using the machine learning model and based on the encoded time derivative feature and the encoded gradient feature, the operational mode of the equipment into the different failure categories.

Embodiment 20: The non-transitory, computer-readable medium of any one of Embodiments 17-19, wherein the operations comprise: determining outlier features of data values for the time window, wherein classifying the operational mode of the equipment comprises classifying, using the machine learning model and based on the outlier features, the operational mode of the equipment.

As used herein, the term "or" is inclusive unless otherwise explicitly noted. Thus, the phrase "at least one of A, B, or C" is satisfied by any element from the set {A, B, C} or any combination thereof, including multiples of any element.

The invention claimed is:

1. A method comprising:
   receiving a time series of data values for a time window of each operational parameter of a number of operational parameters of equipment;
   calculating a time derivative feature that comprises a change of the data values of a first operational parameter of the number of operational parameters over the time window;
   encoding the time derivative feature of the first operational parameter to generate a time derivative encoded value based on a rate of change of the time derivative feature over some period of time during the time window relative to a set of threshold values;
   training a machine learning model using the time derivative encoded value to learn failure prediction patterns for the equipment; and
   classifying, using the machine learning model and following the training of the machine learning model, an operational mode of the equipment in real time based at least in part on the time derivative encoded value.

2. The method of claim 1, further comprising:
   calculating a gradient feature that comprises a change of the data values of a second operational parameter of the number of operational parameters relative to a change of the data values of a third operational parameter of the number of operational parameters over the time window;
   encoding the gradient feature to generate a gradient encoded value;
   training the machine learning model using the gradient encoded value to learn failure prediction patterns for the equipment; and classifying, using the machine learning model and following the training of the machine learning model, the operational mode of the equipment in real time based at least in part on the gradient encoded value.

3. The method of claim 2,
wherein classifying the operational mode comprises classifying, using the machine learning model and based on the encoded time derivative value and the encoded gradient value, the operational mode of the equipment into different failure categories.

4. The method of claim 3, wherein the different failure categories comprise at least one of stable, unstable, pre-failure, and failure.

5. The method of claim 2, wherein encoding the gradient feature comprises,
in response to an increase of the change in the data values of the second operational parameter relative to the change in the data values of the third operational parameter being greater than a large gradient increase threshold, encoding the gradient as a major gradient increase;
in response to a decrease of the change in the data values of the second operational parameter relative to the change in the data values of the third operational parameter v being greater than a large gradient decrease threshold, encoding the gradient as a major gradient decrease;
in response to the increase of the change in the data values of the second operational parameter relative to the change in the data values of the third operational parameter being less than a small gradient increase threshold, encoding the gradient as a minor gradient increase;
in response to the decrease of the change in the data values of the second operational parameter relative to the change in the data values of the third operational parameter being less than a small gradient decrease threshold, encoding the gradient as a minor gradient decrease; and
in response to the change of the data values of the second operational parameter relative to the change in the data values of the third operational parameter changing less than a constant gradient threshold, encoding the gradient as a constant.

6. The method of claim 1, wherein encoding the time derivative feature comprises,
in response to the change over time of the value of the first operational parameter increasing greater than a drastic time increase threshold, encoding the time derivative feature as a drastic time increase;
in response to the change over time of the value of the first operational parameter decreasing greater than a drastic time decrease threshold, encoding the time derivative feature as a drastic time decrease;
in response to the change over time of the value of the first operational parameter increasing less than a minor time increase threshold, encoding the time derivative feature as a minor time increase;
in response to the change over time of the value of the first operational parameter decreasing less than a minor time decrease threshold, encoding the time derivative feature as a minor time decrease; and
in response to the change over time of the value of the first operational parameter changing less than a constant time threshold, encoding the time derivative feature as a constant.

7. The method of claim 1, further comprising:
determining outlier features of data values for the time window,
wherein classifying the operational mode of the equipment comprises classifying, using the machine learning model and based on the outlier features, the operational mode of the equipment.

8. The method of claim 1, wherein the equipment comprises an electrical submersible pump.

9. The method of claim 1, further comprising: modifying the operation of the equipment in response to the classifying the operational mode of the equipment.

10. A system comprising:
downhole equipment to be positioned in a wellbore;
a number of sensors that are to measure a number of operational parameters of the downhole equipment;
a processor; and
a computer-readable medium having instructions stored thereon that are executable by the processor to cause the processor to,
receive a time series of data values for a time window of each operational parameter of the number of operational parameters;
calculate a time derivative feature that comprises a change of the data values of a first operational parameter of the number of operational parameters over the time window;
encode the time derivative feature of the first operational parameter to generate a time derivative encoded value based on a rate of change of the time derivative feature over some period of time during the time window relative to a set of threshold values;
train a machine learning model using the time derivative encoded value to learn failure prediction patterns for the equipment; and
classify, using the machine learning model and following the training of the machine learning model, an operational mode of the equipment in real time based at least in part on the time derivative encoded value.

11. The system of claim 10, wherein the instructions comprise instructions executable by the processor to cause the processor to:
calculate a gradient feature that comprises a change of the data values of a second operational parameter of the number of operational parameters relative to a change of the data values of a third operational parameter of the number of operational parameters over the time window,
encode the gradient feature to generate a gradient encoded value;
train the machine learning model using the gradient encoded value to learn failure prediction patterns for the equipment; and
classify, using the machine learning model and following the training of the machine learning model, the operational mode of the equipment in real time based at least in part on the gradient encoded value.

12. The system of claim 11,
wherein the instructions to classify the operational mode of the equipment comprises instructions executable by the processor to cause the processor to classify, using the machine learning model and based on the encoded time derivative feature and the encoded gradient feature, the operational mode of the equipment into different failure categories.

13. The system of claim 10, wherein the instructions comprise instructions executable by the processor to cause the processor to:
  determine outlier features of data values for the time window,
  wherein the instructions to classify the operational mode of the equipment comprises instructions executable by the processor to cause the processor to classify, using the machine learning model and based on the outlier features, the operational mode of the equipment.

14. The system of claim 13, wherein the different failure categories comprise at least one of stable, unstable, pre-failure, and failure.

15. The system of claim 10, wherein the equipment comprises an electrical submersible pump.

16. The system of claim 10, wherein the instructions comprise instructions executable by the processor to cause the processor to modify the operation of the equipment in response to the classifying the operational mode of the equipment.

17. A non-transitory, computer-readable medium having instructions stored thereon that are executable by a processor to perform operations comprising:
  receiving a time series of data values for a time window of each operational parameter of a number of operational parameters of equipment;
  calculating a time derivative feature that comprises a change of the data values of a first operational parameter of the number of operational parameters over the time window;
  encoding the time derivative feature of the first operational parameter to generate a time derivative encoded value based on a rate of change of the time derivative feature over some period of time during the time window relative to a set of threshold values;
  training a machine learning model using the time derivative encoded value to learn failure prediction patterns for the equipment; and
  classifying, using the machine learning model and following the training of the machine learning model, an operational mode of the equipment in real time based at least in part on the time derivative encoded value.

18. The non-transitory, computer-readable medium of claim 17, wherein the operations comprise:
  calculating a gradient feature that comprises a change of the data values of a second operational parameter of the number of operational parameters relative to a change of the data values of a third operational parameter of the number of operational parameters over the time window
  encoding the gradient feature to generate a gradient encoded value;
  training the machine learning model using the gradient encoded value to learn failure prediction patterns for the equipment; and
  classifying, using the machine learning model and following the training of the machine learning model, the operational mode of the equipment in real time based at least in part on the gradient encoded value.

19. The non-transitory, computer-readable medium of claim 18,
  wherein classifying the operational mode comprises classifying, using the machine learning model and based on the encoded time derivative feature and the encoded gradient feature, the operational mode of the equipment into different failure categories.

20. The non-transitory, computer-readable medium of claim 17, wherein the operations comprise:
  determining outlier features of data values for the time window,
  wherein classifying the operational mode of the equipment comprises classifying, using the machine learning model and based on the outlier features, the operational mode of the equipment.

* * * * *